(12) United States Patent
Lin et al.

(10) Patent No.: US 7,172,915 B2
(45) Date of Patent: Feb. 6, 2007

(54) OPTICAL-INTERFERENCE TYPE DISPLAY PANEL AND METHOD FOR MAKING THE SAME

(75) Inventors: Wen-Jian Lin, Hsinchu (TW); Hung-Huei Hsu, Hsinchu (TW); Hsiung-Kuang Tsai, Taipei (TW)

(73) Assignee: Qualcomm Mems Technologies Co., Ltd., San Diego, CA (US)

( * ) Notice: Subject to any disclaimer, the term of this patent is extended or adjusted under 35 U.S.C. 154(b) by 109 days.

(21) Appl. No.: 10/752,666

(22) Filed: Jan. 8, 2004

(65) Prior Publication Data

US 2004/0147198 A1   Jul. 29, 2004

(30) Foreign Application Priority Data

Jan. 29, 2003  (TW) .............................. 92101978 A

(51) Int. Cl.
  *H01L 21/00* (2006.01)
  *H01J 9/00* (2006.01)
  *G02B 26/00* (2006.01)
(52) U.S. Cl. .......................... 438/38; 445/24; 359/290
(58) Field of Classification Search .................. 438/38; 445/24; 359/290, 291
   See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,813,256 A | 5/1974 | Marks | |
| 3,955,880 A | 5/1976 | Lierke | |
| 4,099,854 A | 7/1978 | Decker et al. | |
| 4,228,437 A | 10/1980 | Shelton | |
| 4,377,324 A | 3/1983 | Durand et al. | |
| 4,389,096 A | 6/1983 | Hori et al. | |
| 4,392,711 A | 7/1983 | Moraw et al. | |
| 4,403,248 A | 9/1983 | Te Velde | |
| 4,441,791 A | 4/1984 | Hornbeck | |
| 4,445,050 A | 4/1984 | Marks | |

(Continued)

FOREIGN PATENT DOCUMENTS

DE  4108966 A1  9/1992

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—David S. Blum
(74) *Attorney, Agent, or Firm*—Knobbe Martens Olson & Bear

(57) ABSTRACT

An optical-interference type display panel and a method for making the same are disclosed, wherein the display panel has a substrate on which multiple first conductive optical film stacks, supporting layers and multiple second conductive optical film stacks are formed. The substrate further has a plurality of connecting pads consisting of a transparent conductive film of the first conductive optical film stacks. Since the transparent conductive film is made of indium tin oxide, these connecting pads have the excellent anti-oxidation ability at their surface.

15 Claims, 29 Drawing Sheets

U.S. PATENT DOCUMENTS

| | | |
|---|---|---|
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | Te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,355,357 A | 10/1994 | Yamamori et al. |
| 5,358,601 A | 10/1994 | Cathey |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,614,937 A | 3/1997 | Nelson |
| 5,619,059 A | 4/1997 | Li et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,636,052 A | 6/1997 | Arney et al. |
| 5,636,185 A | 6/1997 | Brewer et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,683,591 A | 11/1997 | Offenberg |

| Patent No. | Date | Inventor |
|---|---|---|
| 5,703,710 A | 12/1997 | Brinkman et al. |
| 5,710,656 A | 1/1998 | Goossen |
| 5,726,480 A | 3/1998 | Pister |
| 5,739,945 A | 4/1998 | Tayebati |
| 5,740,150 A | 4/1998 | Uchimaru et al. |
| 5,745,193 A | 4/1998 | Urbanus et al. |
| 5,745,281 A | 4/1998 | Yi et al. |
| 5,751,469 A | 5/1998 | Arney et al. |
| 5,771,116 A | 6/1998 | Miller et al. |
| 5,784,190 A | 7/1998 | Worley |
| 5,784,212 A | 7/1998 | Hornbeck |
| 5,786,927 A | 7/1998 | Greywall et al. |
| 5,793,504 A | 8/1998 | Stoll |
| 5,808,780 A | 9/1998 | McDonald |
| 5,808,781 A | 9/1998 | Arney et al. |
| 5,818,095 A | 10/1998 | Sampsell |
| 5,825,528 A | 10/1998 | Goossen |
| 5,835,255 A * | 11/1998 | Miles ........................ 359/291 |
| 5,838,484 A | 11/1998 | Goossen et al. |
| 5,842,088 A | 11/1998 | Thompson |
| 5,912,758 A | 6/1999 | Knipe et al. |
| 5,943,158 A | 8/1999 | Ford et al. |
| 5,959,763 A | 9/1999 | Bozler et al. |
| 5,986,796 A | 11/1999 | Miles |
| 5,994,174 A | 11/1999 | Carey et al. |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,056,406 A | 5/2000 | Park et al. |
| 6,061,075 A | 5/2000 | Nelson et al. |
| 6,097,145 A | 8/2000 | Kastalsky et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,158,156 A | 12/2000 | Patrick |
| 6,160,833 A | 12/2000 | Floyd et al. |
| 6,171,945 B1 | 1/2001 | Mandal et al. |
| 6,172,797 B1 | 1/2001 | Huibers |
| 6,180,428 B1 | 1/2001 | Peeters et al. |
| 6,195,196 B1 | 2/2001 | Koichi et al. |
| 6,201,633 B1 | 3/2001 | Peeters et al. |
| 6,215,221 B1 | 4/2001 | Cabuz et al. |
| 6,232,936 B1 | 5/2001 | Gove et al. |
| 6,243,149 B1 | 6/2001 | Swanson et al. |
| 6,282,010 B1 | 8/2001 | Sulzbach et al. |
| 6,288,472 B1 | 9/2001 | Cabuz et al. |
| 6,288,824 B1 | 9/2001 | Kastalsky |
| 6,295,154 B1 | 9/2001 | Laor et al. |
| 6,323,982 B1 | 11/2001 | Hornbeck |
| 6,331,909 B1 | 12/2001 | Dunfield |
| 6,335,831 B2 | 1/2002 | Kowarz et al. |
| 6,356,254 B1 | 3/2002 | Kimura |
| 6,358,021 B1 | 3/2002 | Cabuz |
| 6,376,787 B1 | 4/2002 | Martin et al. |
| 6,407,851 B1 | 6/2002 | Islam et al. |
| 6,433,917 B1 | 8/2002 | Mei et al. |
| 6,447,126 B1 | 9/2002 | Hornbeck |
| 6,456,420 B1 | 9/2002 | Goodwin-Johansson |
| 6,465,355 B1 | 10/2002 | Horsley |
| 6,466,190 B1 | 10/2002 | Evoy |
| 6,466,354 B1 | 10/2002 | Gudeman |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,608,268 B1 | 8/2003 | Goldsmith |
| 6,625,047 B2 | 9/2003 | Coleman, Jr., deceased |
| 6,630,786 B2 | 10/2003 | Cummings et al. |
| 6,632,698 B2 | 10/2003 | Ives |
| 6,635,919 B1 | 10/2003 | Melendez et al. |
| 6,643,069 B2 | 11/2003 | Dewald |
| 6,650,455 B2 | 11/2003 | Miles |
| 6,657,832 B2 | 12/2003 | Williams et al. |
| 6,660,656 B2 | 12/2003 | Cheung et al. |
| 6,666,561 B1 | 12/2003 | Blakley |
| 6,674,033 B1 | 1/2004 | Chui et al. |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,383 B2 | 5/2004 | Huilbers et al. |
| 6,741,384 B1 | 5/2004 | Martin et al. |
| 6,741,503 B1 | 5/2004 | Farris et al. |
| 6,747,785 B2 | 6/2004 | Chen et al. |
| 6,747,800 B1 | 6/2004 | Lin |
| 6,775,174 B2 | 8/2004 | Huffman et al. |
| 6,778,155 B2 | 8/2004 | Doherty et al. |
| 6,794,119 B2 | 9/2004 | Miles |
| 6,811,267 B1 | 11/2004 | Allen et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,912,022 B2 | 6/2005 | Lin et al. |
| 6,959,990 B2 | 11/2005 | Penn |
| 2001/0003487 A1 | 6/2001 | Miles |
| 2001/0028503 A1 | 10/2001 | Flanders et al. |
| 2002/0014579 A1 | 2/2002 | Dunfield |
| 2002/0015215 A1 | 2/2002 | Miles |
| 2002/0021485 A1 | 2/2002 | Pilossof |
| 2002/0024711 A1 | 2/2002 | Miles |
| 2002/0054424 A1 | 5/2002 | Miles |
| 2002/0076566 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kurdle et al. |
| 2002/0149828 A1 | 10/2002 | Miles |
| 2002/0149850 A1 | 10/2002 | Heffner et al. |
| 2002/0167072 A1 | 11/2002 | Andosca |
| 2002/0167730 A1 | 11/2002 | Needham et al. |
| 2002/0186483 A1 | 12/2002 | Hagelin et al. |
| 2003/0015936 A1 | 1/2003 | Yoon et al. |
| 2003/0016428 A1 | 1/2003 | Kato et al. |
| 2003/0029705 A1 | 2/2003 | Qui et al. |
| 2003/0043157 A1 | 3/2003 | Miles |
| 2003/0053078 A1 | 3/2003 | Missey et al. |
| 2003/0072070 A1 | 4/2003 | Miles |
| 2003/0156315 A1 | 8/2003 | Li et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 | 1/2004 | Sato |
| 2004/0027671 A1 | 2/2004 | Wu et al. |

| | | | | | | |
|---|---|---|---|---|---|---|
| 2004/0027701 A1 | 2/2004 | Ishikawa | | JP | 8-185978 | 7/1996 |
| 2004/0051929 A1 | 3/2004 | Sampsell et al. | | JP | 11-24095 | 1/1999 |
| 2004/0056742 A1 | 3/2004 | Dabbaj | | JP | 11211999 | 8/1999 |
| 2004/0058532 A1 | 3/2004 | Miles et al. | | JP | 11211999 A | 11/1999 |
| 2004/0075967 A1 | 4/2004 | Lynch et al. | | JP | 2000-187233 | 7/2000 |
| 2004/0080035 A1 | 4/2004 | Delapierre | | JP | 2002277771 A | 9/2002 |
| 2004/0080807 A1 | 4/2004 | Chen et al. | | JP | 2003195201 A | 7/2003 |
| 2004/0100594 A1 | 5/2004 | Huibers et al. | | JP | 2004157527 A | 6/2004 |
| 2004/0100680 A1 | 5/2004 | Huibers et al. | | JP | 2004235465 A | 8/2004 |
| 2004/0160143 A1 | 6/2004 | Shreeve et al. | | JP | 2004286825 A | 10/2004 |
| 2004/0124483 A1 | 7/2004 | Partridge et al. | | TW | 157313 | 5/1991 |
| 2004/0125281 A1 | 7/2004 | Lin et al. | | WO | WO 95/30924 | 11/1995 |
| 2004/0125347 A1 | 7/2004 | Patel et al. | | WO | WO 97/17628 | 5/1997 |
| 2004/0136045 A1 | 7/2004 | Tran | | WO | WO 99/52006 A2 | 10/1999 |
| 2004/0140557 A1 | 7/2004 | Sun et al. | | WO | WO 99/52006 A3 | 10/1999 |
| 2004/0145049 A1 | 7/2004 | McKinnell et al. | | WO | WO 02/079853 | 10/2002 |
| 2004/0145811 A1 | 7/2004 | Lin et al. | | WO | WO 03/007049 A1 | 1/2003 |
| 2004/0147056 A1 | 7/2004 | McKinnell et al. | | WO | WO 03/014789 A2 | 2/2003 |
| 2004/0147198 A1 | 7/2004 | Lin et al. | | WO | WO 03/054925 | 7/2003 |
| 2004/0148009 A1 | 7/2004 | Buzzard et al. | | WO | WO 03/069413 A1 | 8/2003 |
| 2004/0150939 A1 | 8/2004 | Huff | | WO | WO 03/073151 A1 | 9/2003 |
| 2004/0174583 A1 | 9/2004 | Chen et al. | | WO | WO 03/085728 A1 | 10/2003 |
| 2004/0175577 A1 | 9/2004 | Lin et al. | | WO | WO 04/006003 A1 | 1/2004 |
| 2004/0179281 A1 | 9/2004 | Reboa | | WO | WO 04/026757 A2 | 4/2004 |
| 2004/0179445 A1 | 9/2004 | Park et al. | | WO | WO 2005/006364 A1 | 1/2005 |
| 2004/0184766 A1 | 9/2004 | Kim et al. | | WO | WO 2006/014929 | 2/2006 |
| 2004/0201908 A1 | 10/2004 | Kaneko | | | | |
| 2004/0207897 A1 | 10/2004 | Lin | | | | |
| 2004/0209192 A1 | 10/2004 | Lin et al. | | | | |
| 2004/0209195 A1 | 10/2004 | Lin | | | | |
| 2004/0212026 A1 | 10/2004 | Brooklin et al. | | | | |
| 2004/0217378 A1 | 11/2004 | Martin et al. | | | | |
| 2004/0217919 A1 | 11/2004 | Pichi et al. | | | | |
| 2004/0218251 A1 | 11/2004 | Piehl et al. | | | | |
| 2004/0218334 A1 | 11/2004 | Martin et al. | | | | |
| 2004/0218341 A1 | 11/2004 | Martin et al. | | | | |
| 2004/0227493 A1 | 11/2004 | Brocklin et al. | | | | |
| 2004/0233503 A1 | 11/2004 | Kimura | | | | |
| 2004/0240032 A1 | 12/2004 | Miles | | | | |
| 2004/0240138 A1 | 12/2004 | Martin et al. | | | | |
| 2004/0245588 A1 | 12/2004 | Nikkel et al. | | | | |
| 2004/0263944 A1 | 12/2004 | Miles et al. | | | | |
| 2005/0001828 A1 | 1/2005 | Martin et al. | | | | |
| 2005/0002082 A1 | 1/2005 | Miles | | | | |
| 2005/0003667 A1 | 1/2005 | Lin et al. | | | | |
| 2005/0014373 A1 | 1/2005 | Partridge et al. | | | | |
| 2005/0024557 A1 | 2/2005 | Lin | | | | |
| 2005/0035699 A1 | 2/2005 | Tsai | | | | |
| 2005/0036095 A1 | 2/2005 | Yeh et al. | | | | |
| 2005/0036192 A1 | 2/2005 | Lin et al. | | | | |
| 2005/0038950 A1 | 2/2005 | Adelmann | | | | |
| 2005/0042117 A1 | 2/2005 | Lin | | | | |
| 2005/0046922 A1 | 3/2005 | Lin et al. | | | | |
| 2005/0046948 A1 | 3/2005 | Lin | | | | |
| 2005/0057442 A1 | 3/2005 | Way | | | | |
| 2005/0068583 A1 | 3/2005 | Gutkowski et al. | | | | |
| 2005/0068605 A1* | 3/2005 | Tsai ............................ 359/290 | | | | |
| 2005/0068606 A1 | 3/2005 | Tsai | | | | |
| 2005/0069209 A1 | 3/2005 | Damera-Vankata et al. | | | | |

FOREIGN PATENT DOCUMENTS

| | | |
|---|---|---|
| DE | 10228946 A1 | 1/2004 |
| EP | 0 310 176 A2 | 4/1989 |
| EP | 0 667 548 A1 | 8/1995 |
| EP | 0 788 005 | 8/1997 |
| EP | 1275997 | 1/2003 |
| EP | 1 435 336 | 7/2004 |
| EP | 1 473 691 A | 11/2004 |
| EP | 1473581 A2 | 11/2004 |
| FR | 2 824 643 A | 11/2002 |
| JP | 62 082454 | 4/1987 |
| JP | 05275401 A1 | 10/1993 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Bass, "Handbook of Optics, vol. 1, Fundamentals, Techniques, and Design, Second Edition," McGraw-Hill, Inc., New York, pp. 2.29-2.36 (1995).

Butler et al., "An Embedded Overlay Concept for Microsystems Packaging," IEEE Transactions on Advanced Packaging IEEE USA, vol. 23, No. 4, pp. 617-622, XP002379648 (2000).

Chiou et al., "A Novel Capacitance Control Design of Tunable Capacitor Using Multiple Electrostatic Driving Electrodes," IEEE Nano 2001, M 3.1, Nanoelectronics and Giga-Scale Systems (Special Session), Oct. 29, 2001, pp. 319-324.

Chunjun Wang et al., "Flexible curcuit-based RF Mems Switches," Mems. XP002379649 pp. 757-762, (Nov. 2001).

Conner, "Hybrid Color Display Using Optical Interference Filter Arry," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121, (Sep. 1994), Goossen, "MEMS-based variable optical interference devices," Optical MEMS, 2000 IEEE/LEDS Int'l. Conf. on Aug. 21-24, 2000, Piscatawny, NJ, Aug. 21, 2000, pp. 17-18.

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1998).

Jerman et al., "Miniature Fabry-Perot Interferometers Micromachined in Silicon for Use in Optical Fiber WDM Systems," Transducers, San Francisco, Jun. 24-27m 1991, Proceedings on the Int'l. Conf. on Solid State Sensors and Actuators, vol. CONF. 6, Jun. 24, 1991, pp. 372-375.

Joannopoulos et al., "Molding the Flow of Light," Photonic Crystals, 1995.

Johnson "Optical Scanners", Microwave Scanning Antennas, vol. 1, pp. 251-261, (1964).

Circle 36: Light over Matter, Circle No. 36 (Jun. 1993).

Miles, Mark, W., "A New Reflective FPD Technology Using Interferometric Modulation", the Proceedings of the Society for Information Display (May 11-16, 1997).

Nagami et al., "Plastic Cell Architecture: Towards Reconfiguarable Computing for General-Purpose," Proc. IEEE Workshop on FPGA-based Custom Computing Machines, (1998).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1996).

Peerlings et al., "Long Resonator Micromachined Tunable GaAs-AlAs Fabry-Perot Filter," IEEE Photonics Technology Letters, IEEE service Center, Piscatawny, NJ, vol. 9, No. 9, Sep. 1997, pp. 1235-1237.

Raley et al., "A Fabry-Perot Microinterferometer for Visible Wavelngths", IEEE Solid-State Sensor and Actuator Workshop, Jun. 1992, Hilton Head, SC.

Schnakenberg, et al. TMAHW etchants for Silicon Micromachining. 1991 International Conference on Solid State Sensors and Actuators-Digest of Technical Papers, pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Wu et al., "MEMS Designed for Tunable Capacitors," Microwave Symposium Digest, 1998 IEEE MTT-S Int'l., Baltimore, MD, 7-12 Jun. 1998, vol. 1, pp. 127-129.

Zhou et al., "Waveguide Panel Display Using Electromechanical Spatial Modulators," SID Digest, vol. XXIX, 1998.

European Search Report Application No. 05255693.3 -2217, dated May 24, 2006.

European Search Report Application No. EP 05 25 5673 in 9 pages, dated Jan. 23, 2006.

International Search Report and Written Opinion of the International Searching Authority for PCT/US2005/005919 dated Aug. 24, 2005.

International Search Report Application No. PCT/US2005/026448, Dated Nov. 23, 2005.

International Search Report Application No. PCT/US2005/029820, Dated Dec. 27, 2005.

International Search Report Application No. PCT/US2005/030962, Dated Aug. 31, 2005.

International Search Report Application No. PCT/US2005/034465, Dated Sep. 23, 2005.

Austrian Search Report No. 140/2005, Dated Jul. 15, 2005.
Austrian Search Report No. 161/2005, Dated Jul. 15, 2005.
Austrian Search Report No. 162/2005, Dated Jul. 14, 2005.
Austrian Search Report No. 164/2005, Dated Jul. 4, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.

* cited by examiner

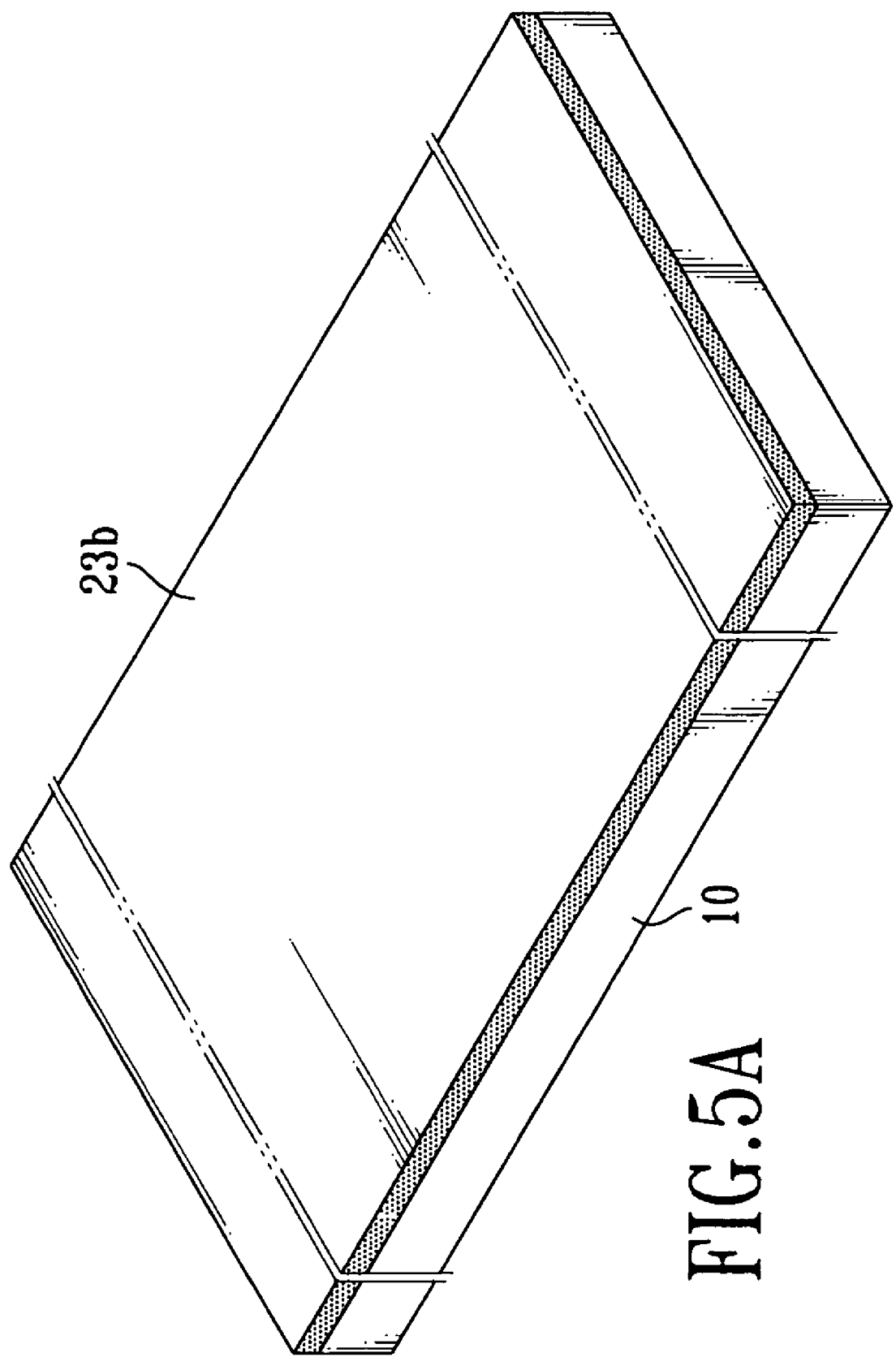

OPTICAL-INTERFERENCE TYPE DISPLAY PANEL AND METHOD FOR MAKING THE SAME

BACKGROUND OF THE INVENTION

1. Field of the Invention

The present invention relates to an optical-interference type display panel and a method for making the same, and more particularly to a display panel in which a transparent conductive layer is employed to form connecting pads for connection to a driving circuit of the panel.

2. Description of Related Art

In order to minimize the bulky size of a computer display, the flat display was developed to replace the conventional CRT display. For example, the most well known flat display is the LCD. In recent years, different kinds of LCDs have been developed by display manufacturers. Most of these manufacturers are dedicated as far as possible to reduce the power consumption of the display so that the LCD will become more suitable for portable electronic products such as cell phones, PDAs and E-books.

Inside the LCD device, the back light module consumes the most power of all the elements. To solve the problem, a reflective type panel is developed, which utilizes the external light as the light source to replace the back light module, or to mitigate the using possibility of the back light module.

Whether for the conventional LCD panel or the reflective type panel, a color filtering film and a polarizing film are constructed in the panel so as to display the color images and control the direction of the light. Even though these thin films are pervious to light, a partial amount of light may be blocked or lost while light passes through these films. To overcome the light loss problem, another reflective type panel called optical-interference panel has accordingly been developed. Based on the interference phenomenon caused when light passes through different thin films, the aforementioned optical-interference panel is able to generate the fundamental red, blue and green colors by properly creating the thin film elements. Thus, the panel is able to show color images without the use of said color filter thin film and polarizing thin film, meanwhile the light transmittance of the panel is also improved so the panel is much more suitable to be applied to the portable electronic products.

With reference to FIG. 12, the single pixel structure in the aforementioned optical-interference panel includes a substrate (70) composed of glass or macromolecule material, a first conductive optical film stack (71) and a supporting layer (72) formed on the substrate (70), and a second conductive optical film stack (73)(also called as a mechanical layer) partly covering the adjacent supporting layers (72), whereby a gap is defined between the first and second conductive optical film stack (71, 73).

When supplying an electric field between the two conductive optical film stacks (71, 73) by an external driving circuit (not shown), the second conductive optical film stack (73) will be slightly deformed and becomes closer to the first conductive optical film stack (71). With the different gap distances between the two conductive optical film stacks (71,73), light beams passing through the panel will have different extents of interference, so that the panel is able to show different colors.

As mentioned above, since the electrical connection is necessary between the conductive optical film stacks (71, 73) and the external driving circuit, a plurality of connecting pads (not shown) that connects these conductive optical film stacks (71, 73) is formed on the substrate (70) for connection to the external driving circuit. Generally, these connecting pads are formed by metal wires. However, because the connecting pads are exposed to the air, these metal wires may become gradually oxidized. Thus, the connecting quality and reliability of the connecting pads may be impaired by the oxidization problem.

To mitigate and/or obviate the aforementioned problem, the present invention provides a novel optical-interference type display panel and a method for making the same.

SUMMARY OF THE INVENTION

One objective of the present invention is to provide an optical-interference type display panel and a method for making the same, wherein the connecting pads for connection to a driving circuit are made of a transparent conductive layer (ITO).

To accomplish the objective, the method has the steps of:
  providing a substrate;
  sequentially forming a plurality of first conductive optical film stacks, a supporting layer, a spacing layer and a plurality of second conductive optical film stacks on the substrate; and
  forming a plurality of connecting pads near edges of the substrate, wherein the plurality of connecting pads is made of a transparent conductive layer of the first conductive optical film stack.

Since said connecting pads are made of a transparent conductive layer composed in said first optical conductive optical film stacks, these connecting pads have the excellent anti-oxidation ability at their surface. Thus, the connecting quality and the reliability of the connecting pads are improved.

Other objects, advantages and novel features of the invention will become more apparent from the following detailed description when taken in conjunction with the accompanying drawings.

BRIEF DESCRIPTION OF THE DRAWINGS

FIGS. 5A–5H show a third embodiment of a manufacturing process of an optical interference panel in accordance with the present invention, where the first conductive optical film stack is adopted from FIG. 2B;

DETAILED DESCRIPTION OF PREFERRED EMBODIMENT

With reference to FIGS. 1A to 1E, a basic manufacturing process of an optical interference panel in accordance with the present invention is disclosed. The process includes the following steps.

Forming a plurality of separated first conductive optical film stacks (20) on a substrate (10): these separated first conductive optical film stacks (20) are formed on the substrate (10) that is composed of glass or macromolecule material.

Figure 1A:
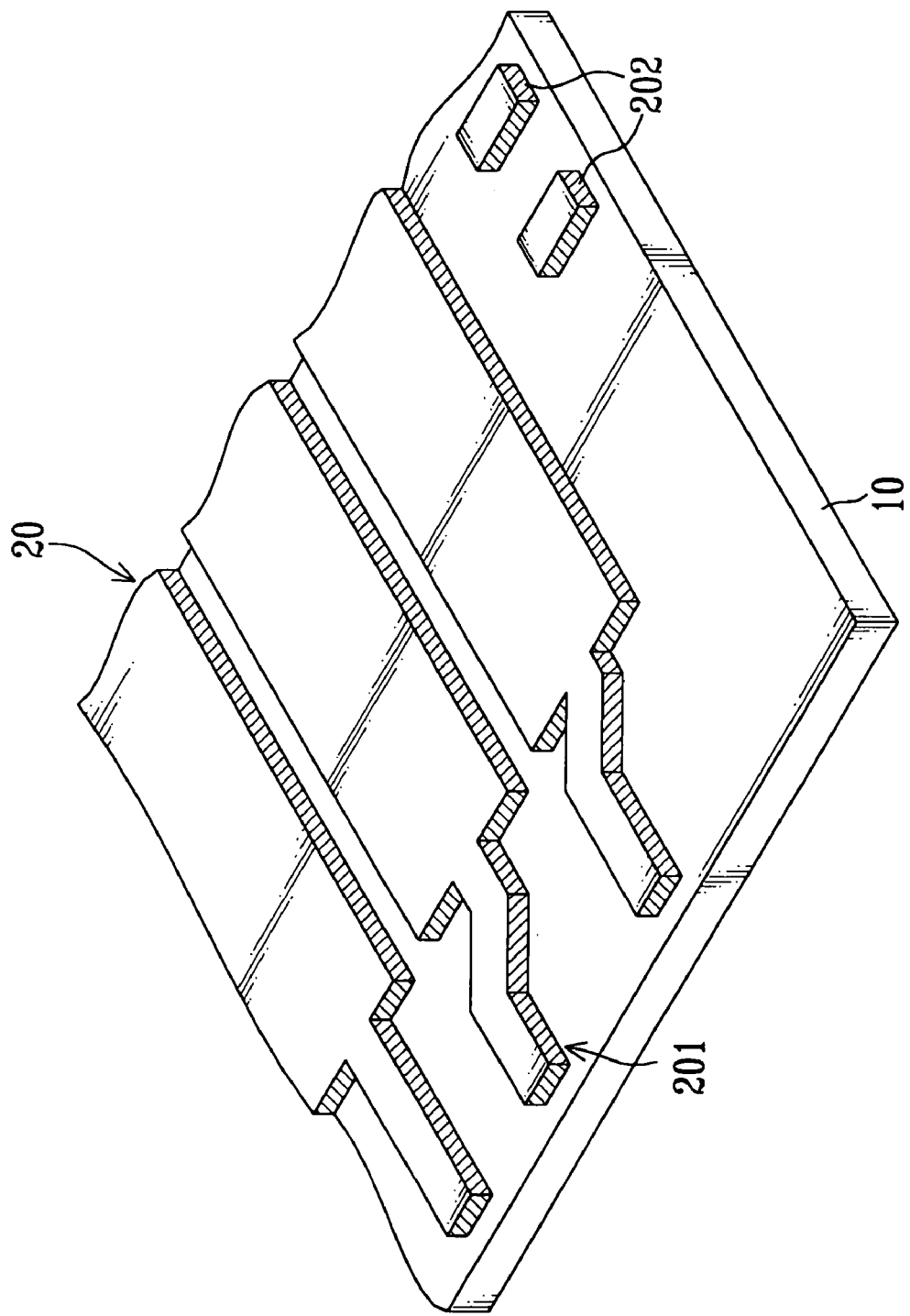
FIGS. 1A–1E show a basic manufacturing process of an optical interference panel in accordance with the present invention.

Defining patterns of connecting pads: portions of these first conductive optical film stacks (20) are further patterned to form multiple connecting pads (201)(202) near the edge of the substrate (10) (as shown in FIG. 1A).

Figure 1B:
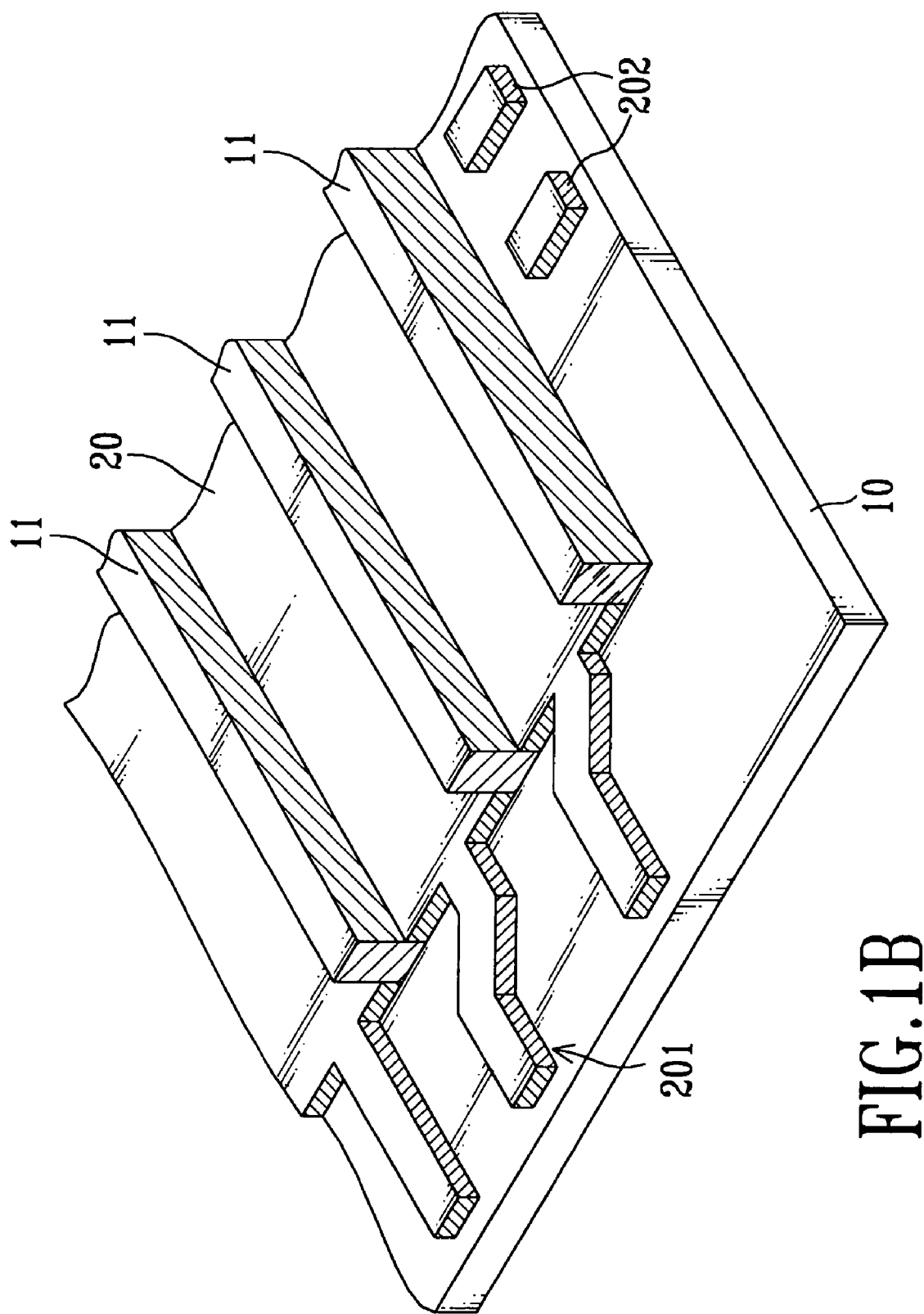

Forming a supporting layer (11) on the substrate (10): a supporting layer (11) is formed on the substrate (10) where the first conductive optical film stack (20) is removed. That is, the supporting layer (11) is formed between two separated first conductive optical film stacks (20) (as shown in FIG. 1B).

Figure 1C:
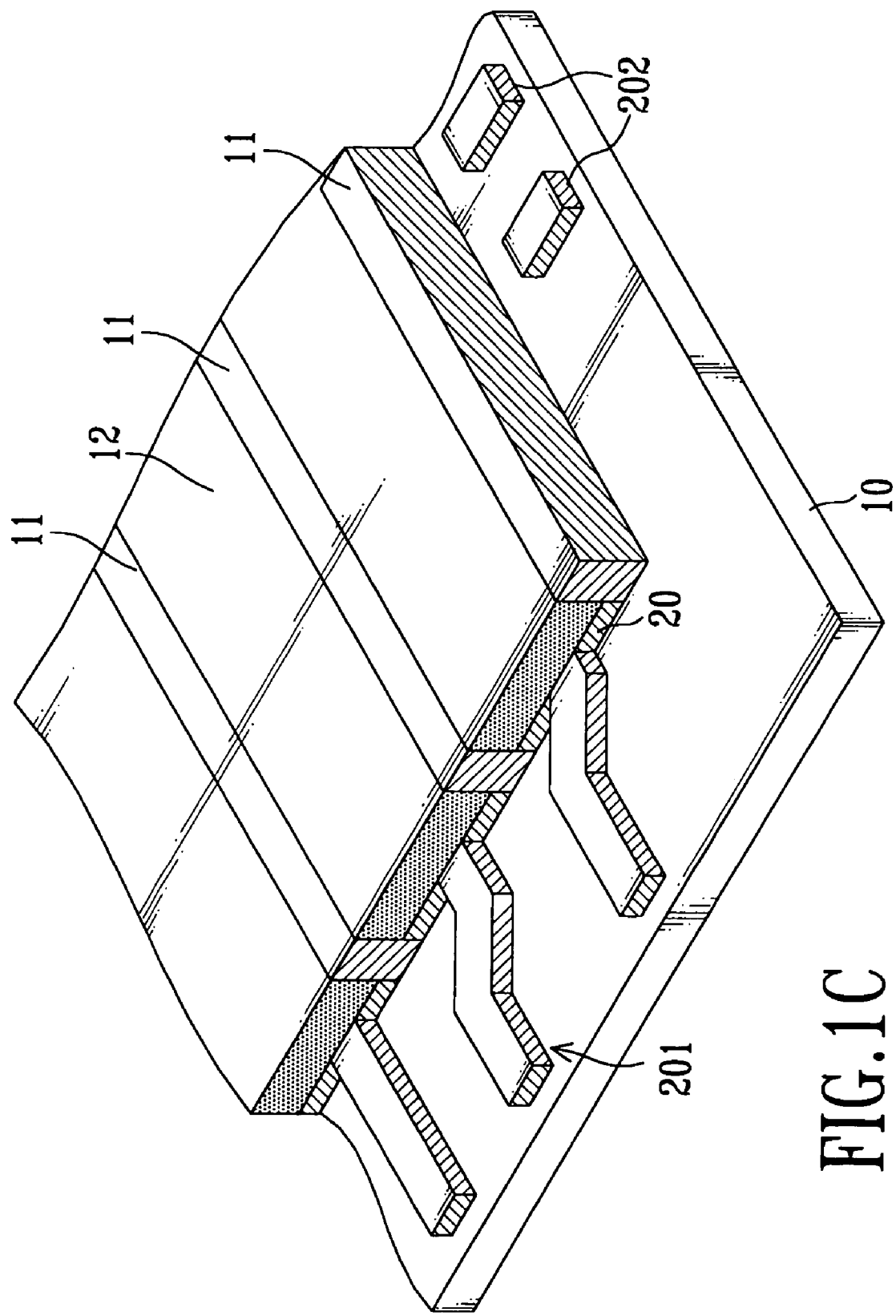

Forming a spacing layer (12): a spacing layer (12) is formed above each separated first conductive optical film stack (20) and is further flattened (as shown in FIG. 1C).

Figure 1D:
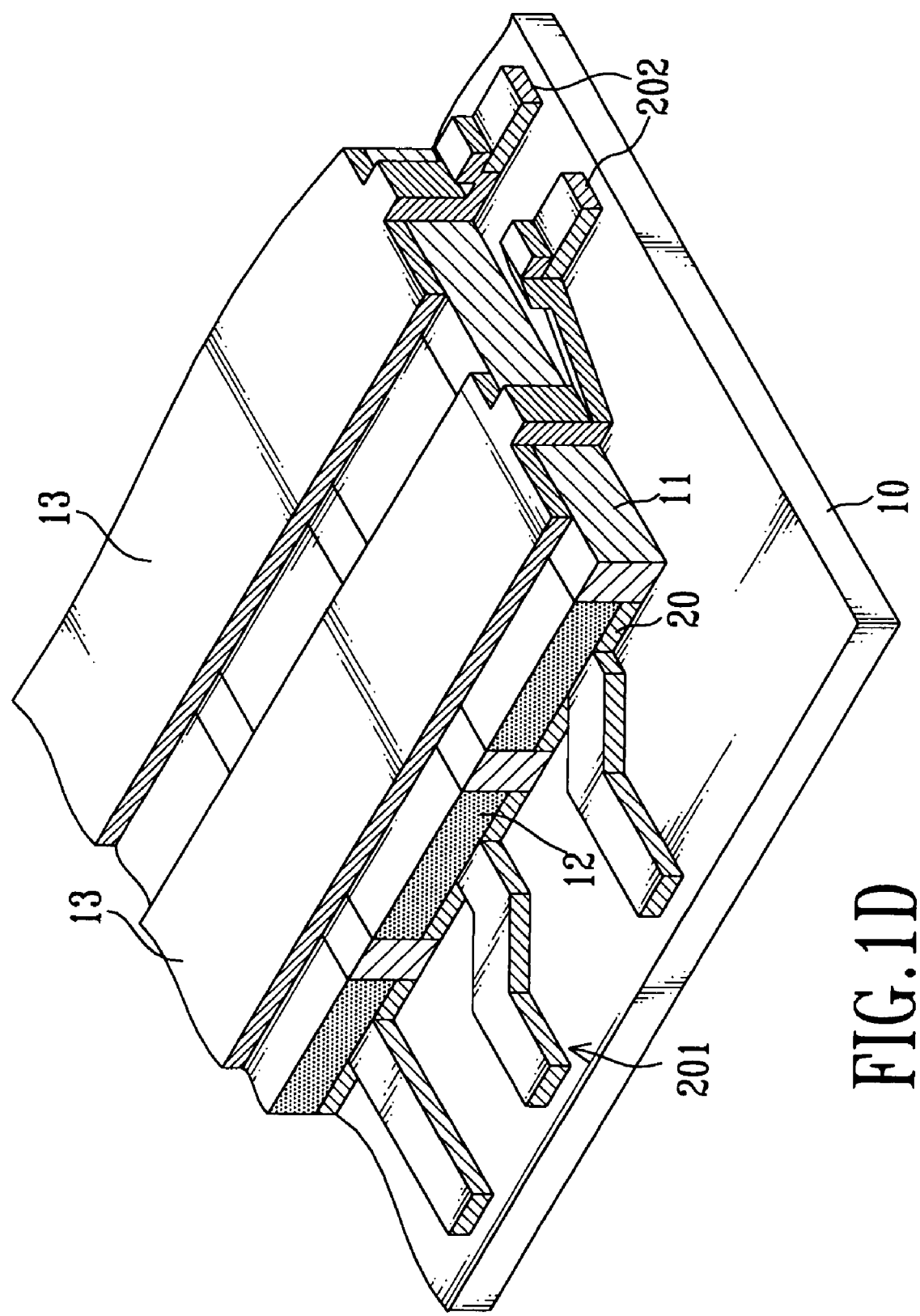

Forming a plurality of second conductive optical film stacks (13): these second conductive optical film stacks (13) are coated on the spacing layer (12) and the supporting layer (11), wherein each second conductive optical film stack (13) is electrically connected to a corresponding connecting pad (202) (as shown in FIG. 1D).

Figure 1E:
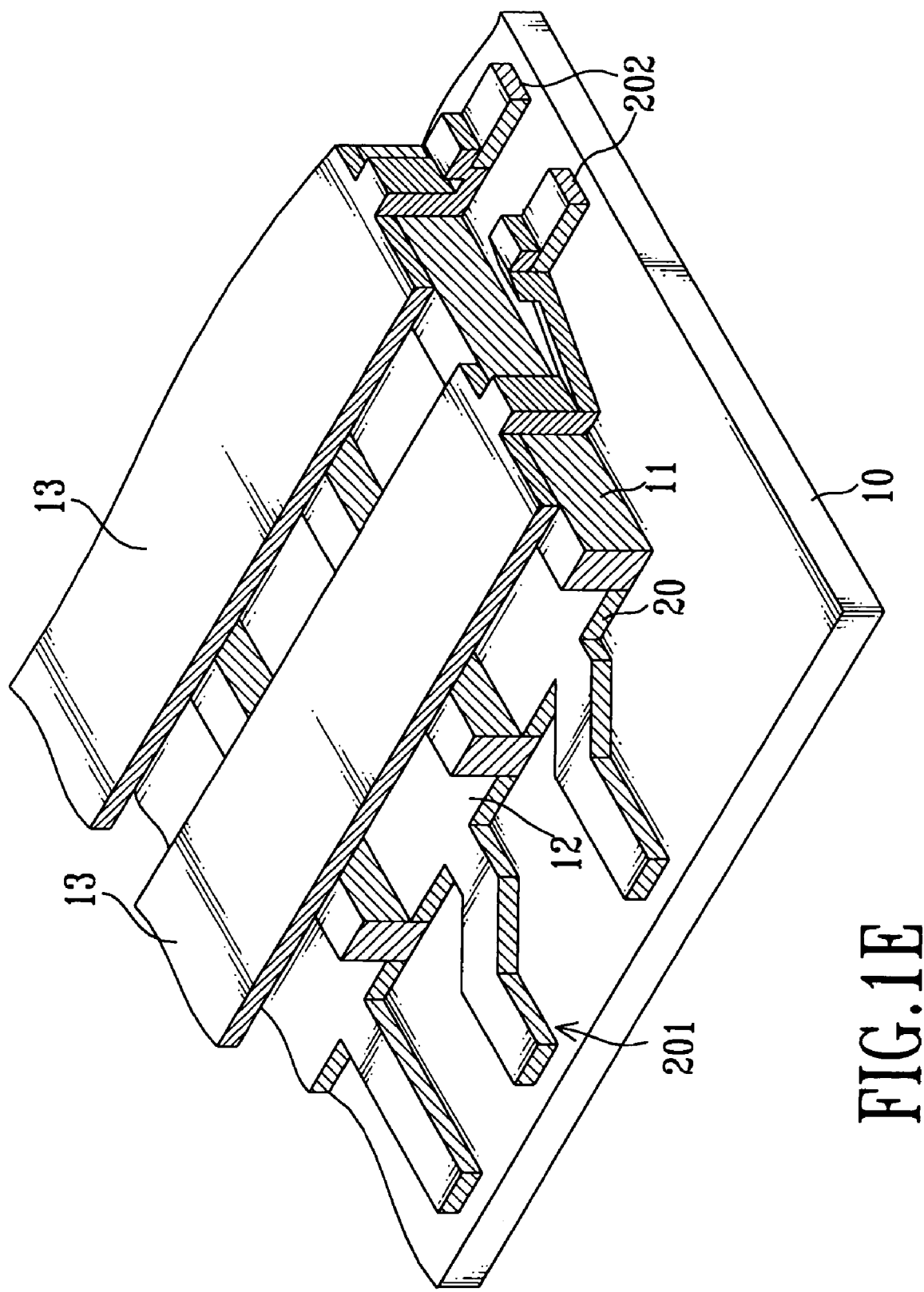

Removing the spacing layer (12): the spacing layer (12) is removed from the substrate (10), whereby a gap is defined by the first and the second conductive optical film stacks (20)(13) (as shown in FIG. 1E).

Based on the basic process as mentioned above, the connecting pads (201)(202) are simultaneously formed on the substrate (10) during the forming processing of the first conductive optical film stack (20). These connecting pads (201)(202) are used as the signal joints for the scan lines and data lines of the panel. Moreover, since these connecting pads (201)(202) are formed by a transparent conductive layer (also called an indium tin oxide film, ITO film) in the first conductive optical film stack (20), these connecting pads (201)(202) possess an excellent anti-oxidation ability at their surface. The connecting quality and the reliability of these connecting pads (201)(202) are improved.

Figure 2A:
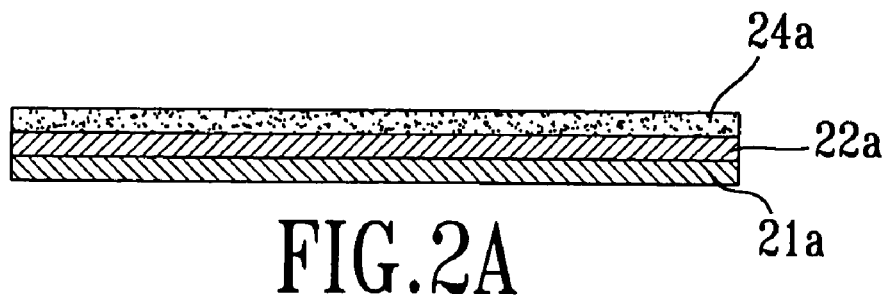
FIGS. 2A–2D show different embodiments of the first conductive optical film stacks of FIGS. 1A–1E.

With reference to FIGS. 2A–2D, said first conductive optical film stack (20) may be formed by different embodiments. In FIG. 2A, the first conductive optical film stack (20) is sequentially composed of a transparent conductive layer (21a), an absorption layer (22a) and a dielectric layer (24a) according to a sequence from the bottom to the top.

Figure 2B:

As shown in FIG. 2B, the first conductive optical film stack (20) is sequentially composed of a first dielectric layer (23b), a transparent conductive layer (21b), an absorption layer (22b) and a second dielectric layer (24b).

Figure 2C:
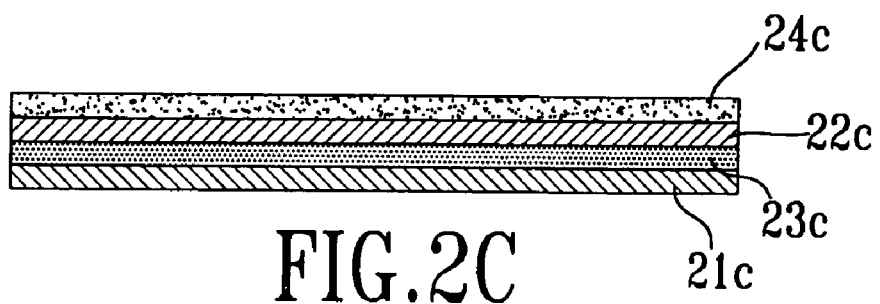

As shown in FIG. 2C, the first conductive optical film stack (20) is sequentially composed of a transparent conductive layer (21c), a first dielectric layer (23c), an absorption layer (22c) and a second dielectric layer (24c).

Figure 2D:

As shown in FIG. 2D, the first conductive optical film stack (20) is sequentially composed of a first dielectric layer (23d), an absorption layer (22d) a transparent conductive layer (21d) and a second dielectric layer (24d).

Because the first conductive optical film stack (20) has different embodiments as described above, the basic manufacturing process will be accordingly modified based on the desired type of first conductive optical film stack (20).

Figure 3A:
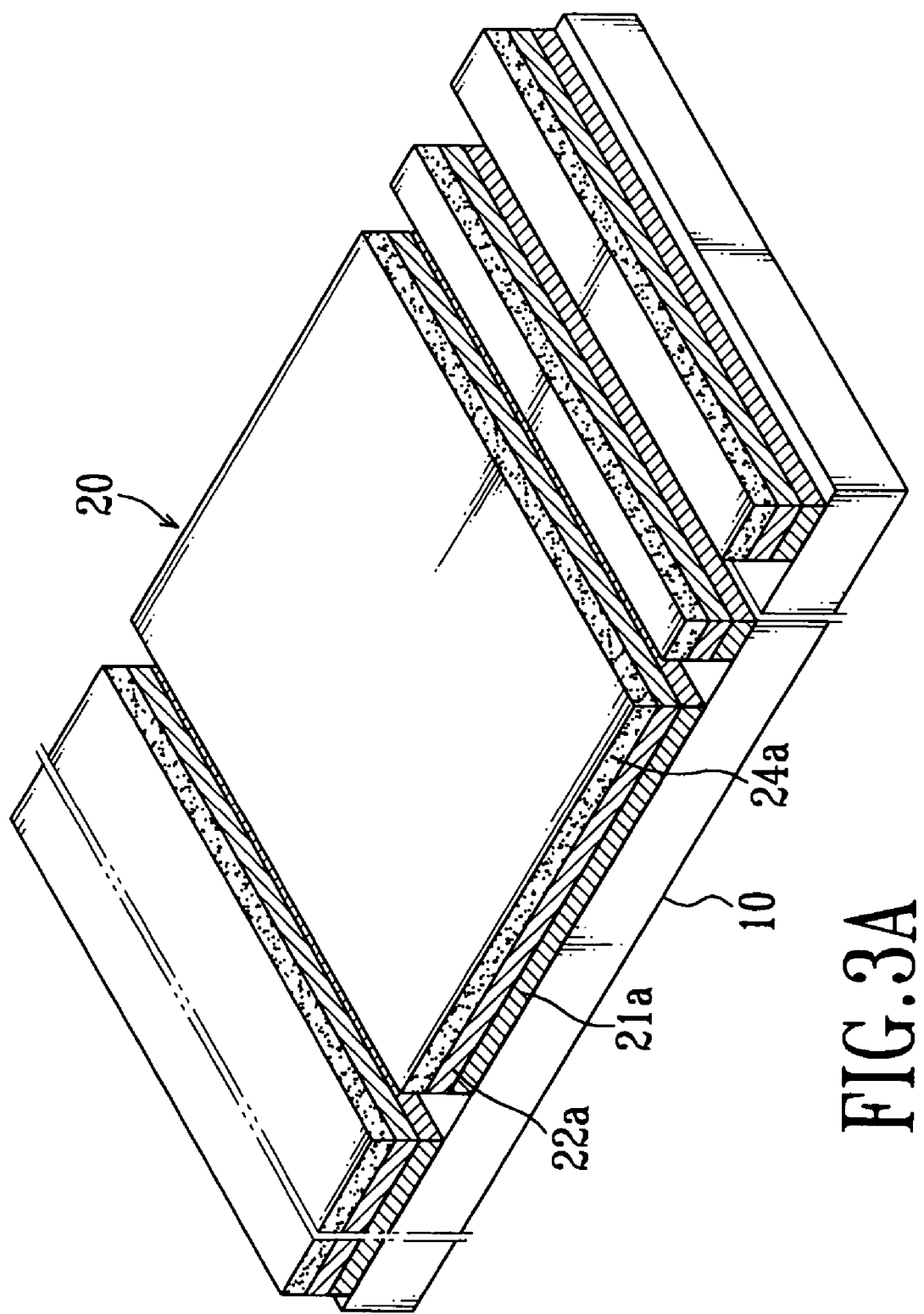
FIGS. 3A–3G show a first embodiment of a manufacturing process of an optical interference panel in accordance with the present invention, where the first conductive optical film stack is adopted from FIG. 2A.
Figure 3B:
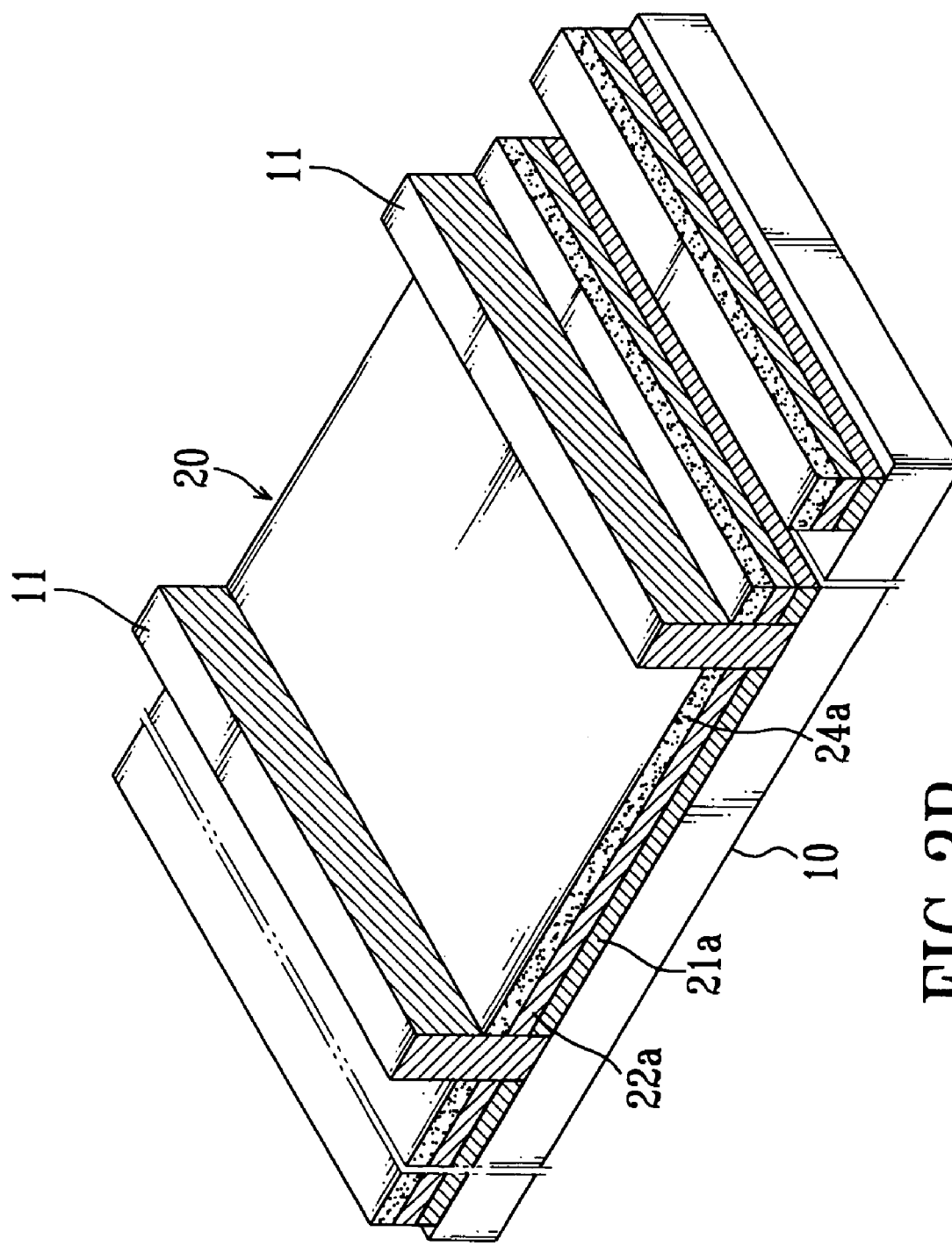
Figure 3C:
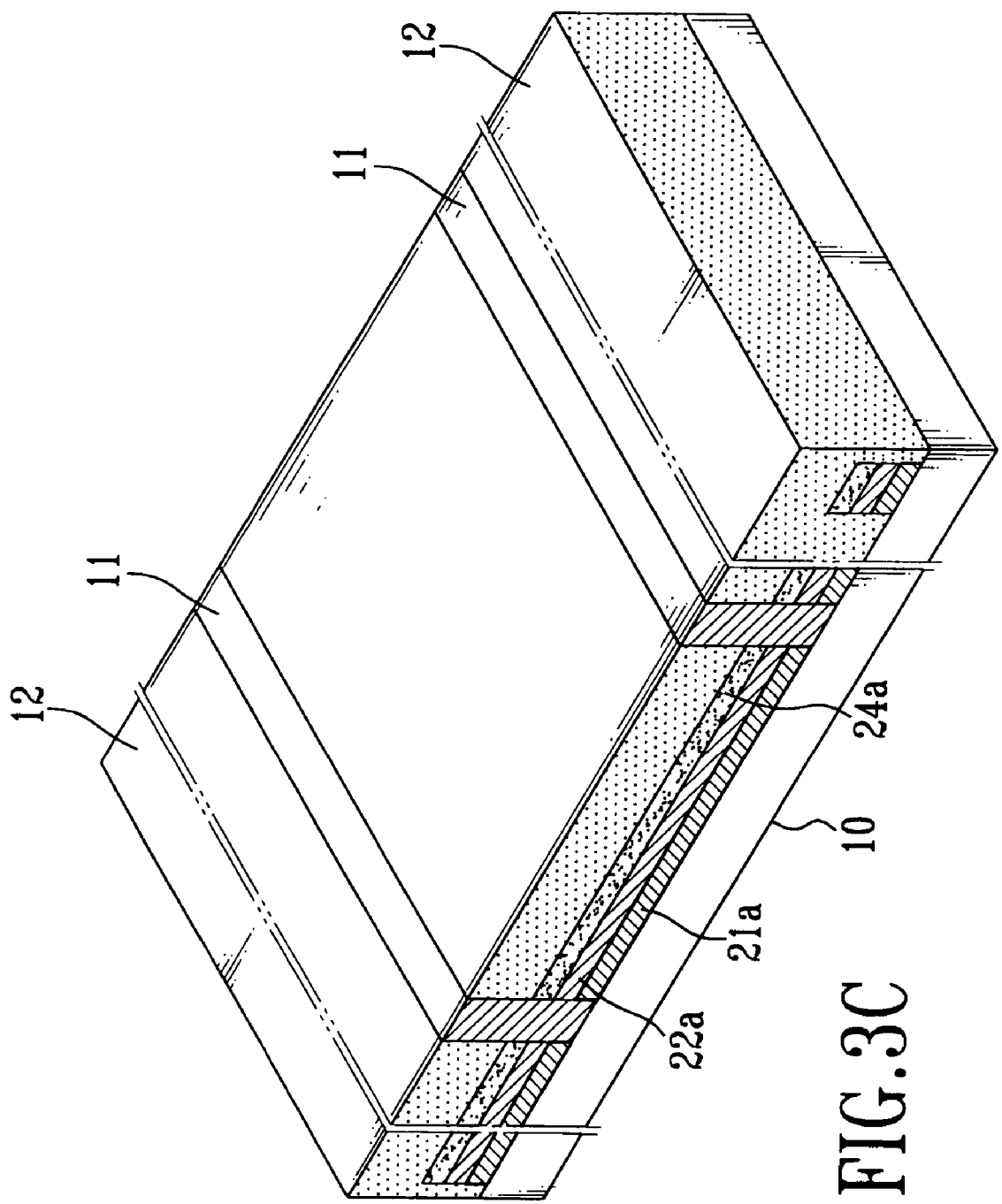
Figure 3D:
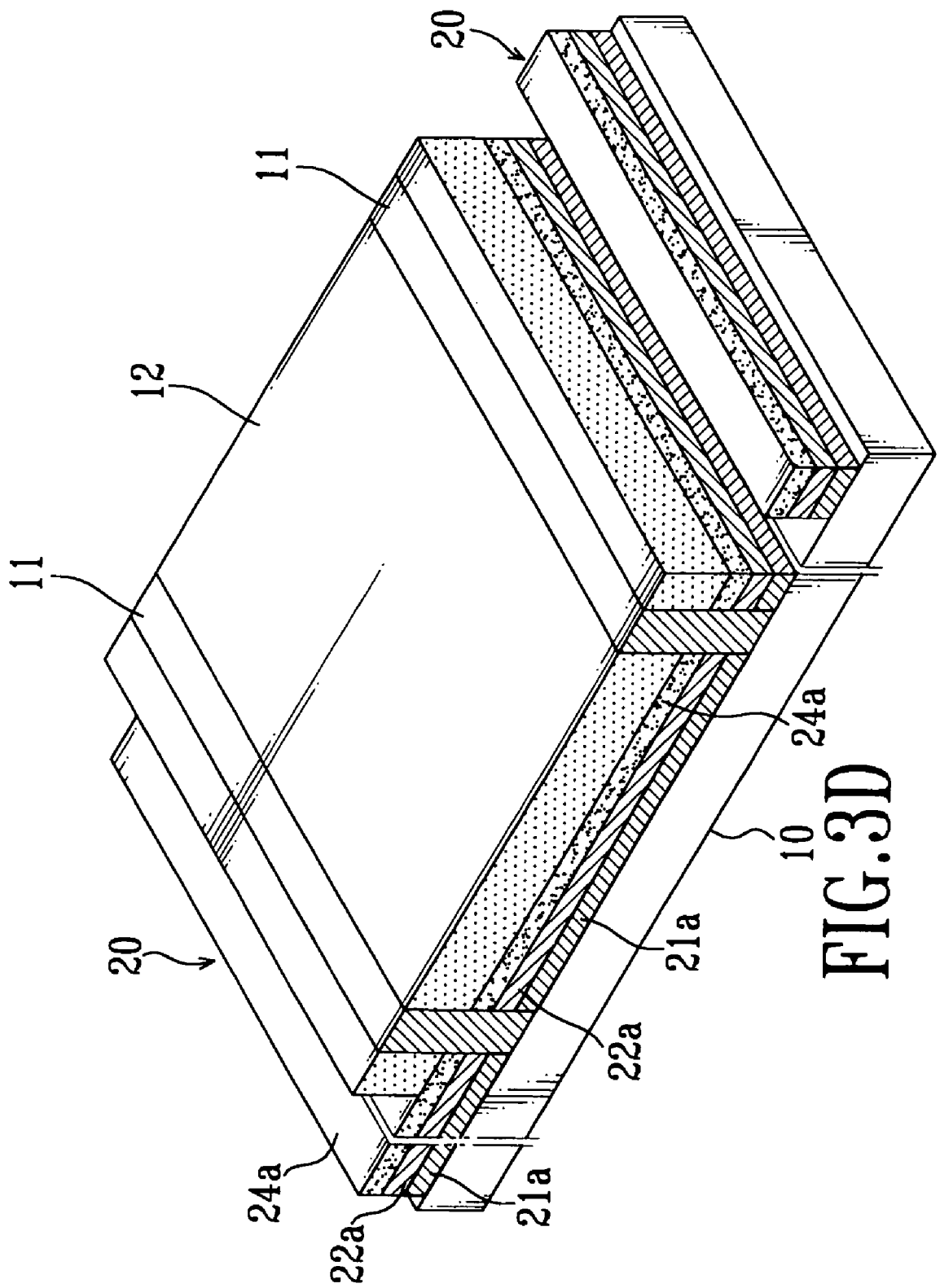
Figure 3E:
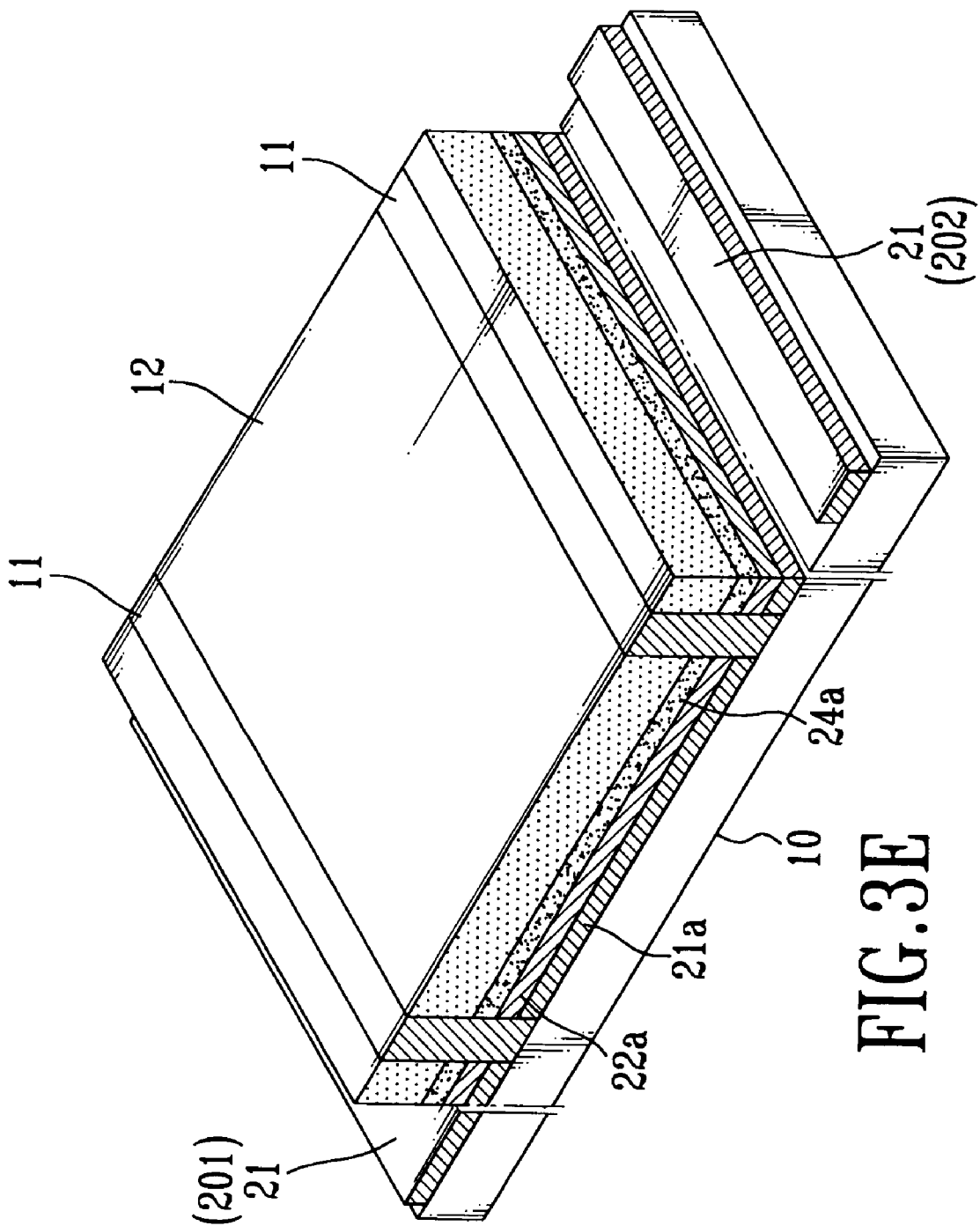
Figure 3F:
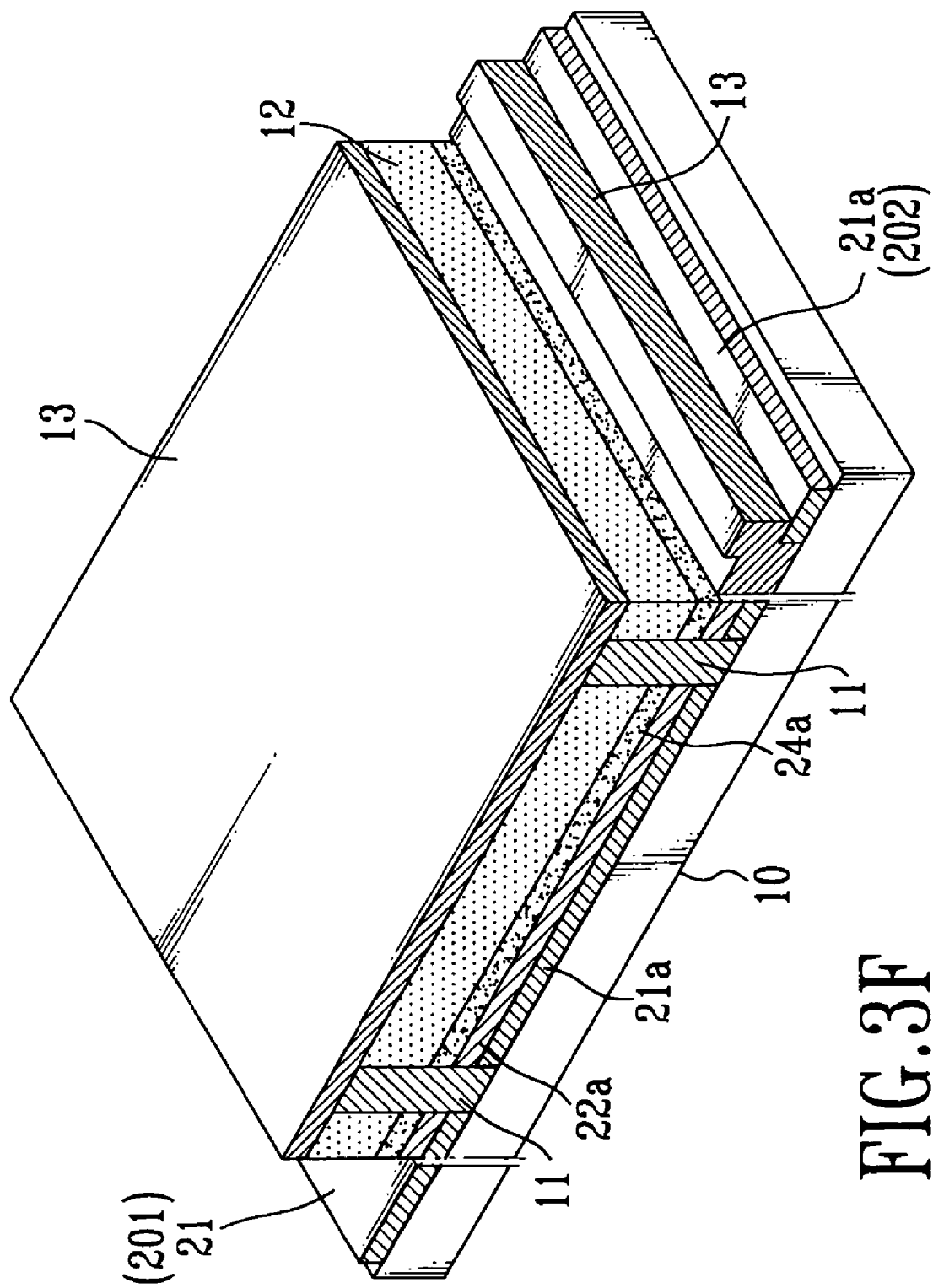
Figure 3G:
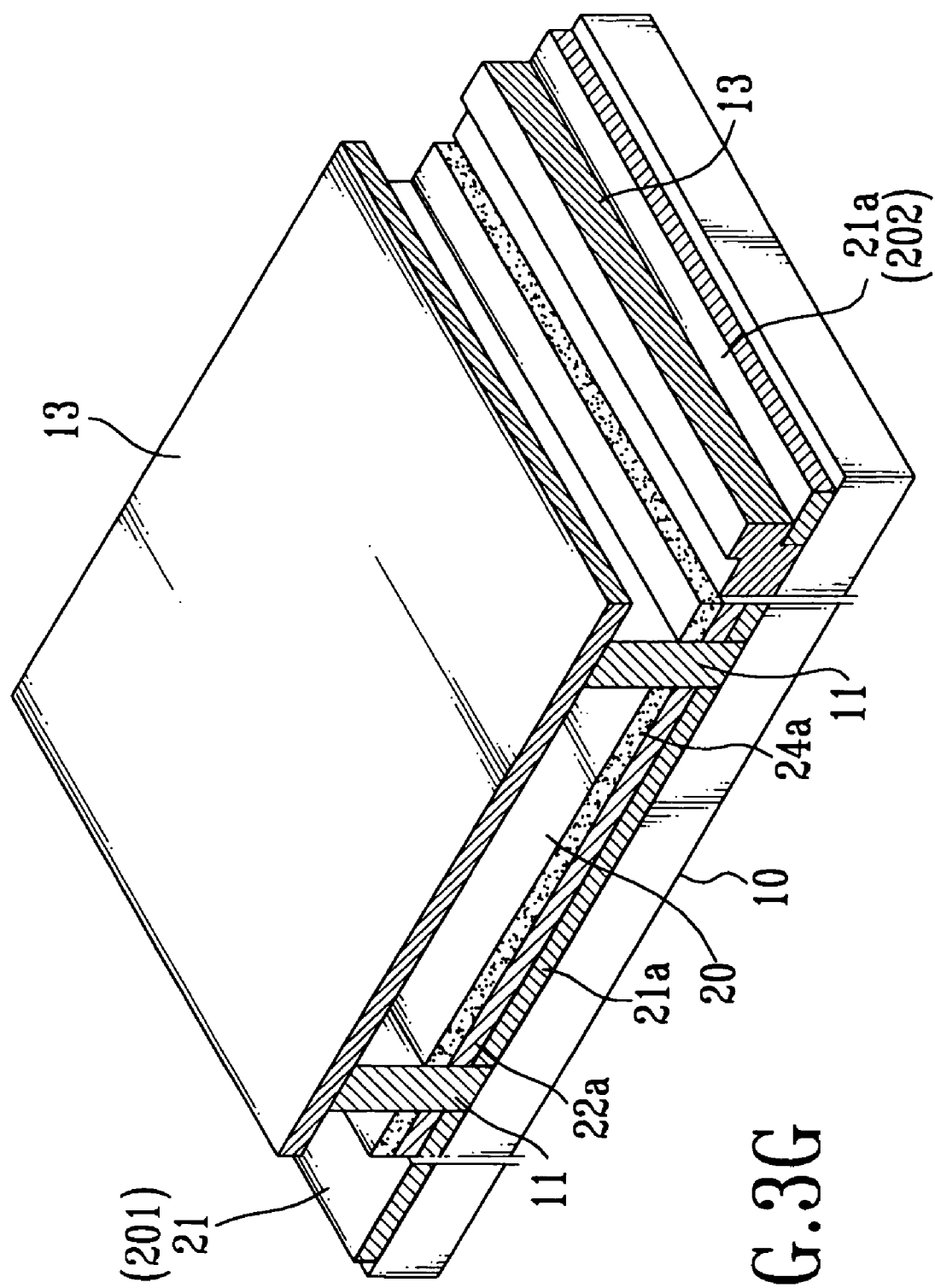

With reference to FIGS. 3A–3G, the first conductive optical film stack (20) is the same as shown in FIG. 2A. The basic manufacturing process is modified as follows:

sequentially forming the transparent conductive layer (21a), the absorption layer (22a) and the dielectric layer (24a) on the substrate (10) so as to construct the first conductive optical film stack (20);

defining patterns of connecting pads (201)(202), wherein a part of the first conductive optical film stack (20) is further patterned to form the connecting pads (201)(202) near the edge of the substrate (10);

forming a supporting layer (11) on the substrate (10), wherein a supporting layer (11) is formed on the substrate (10) where the first conductive optical film stack (20) is removed (as shown in FIG. 3B);

forming a spacing layer (12), wherein a spacing layer (12) is formed on each separated first conductive optical film stack (20) and is further flattened (as shown in FIG. 3C);

removing the spacing layer (12) covering the first conductive optical film stack (20) near the edge of the substrate (10), whereby the first conductive optical film stack (20) formed near the edge is exposed (as shown in FIG. 3D);

removing the dielectric layer (24a) and the absorption layer (22a) of the exposed first conductive optical film stack (20) near the edge of the substrate (10), wherein the transparent conductive layer (21a) remaining on the substrate (10) is used for forming of the connecting pads (201)(202) (as shown in FIG. 3E);

forming a second conductive optical film stack (13) on the spacing layer (12) and the supporting layer (11) remaining on the substrate (10), wherein the second conductive optical film stack (13) is electrically connected to a part of the connecting pads (202) (as shown in FIG. 3F); and removing the spacing layer (12) below the second conductive optical film stack (13), whereby a gap is defined by the first and the second conductive optical film stacks (20)(13) (as shown in FIG. 3G).

Figure 4A:
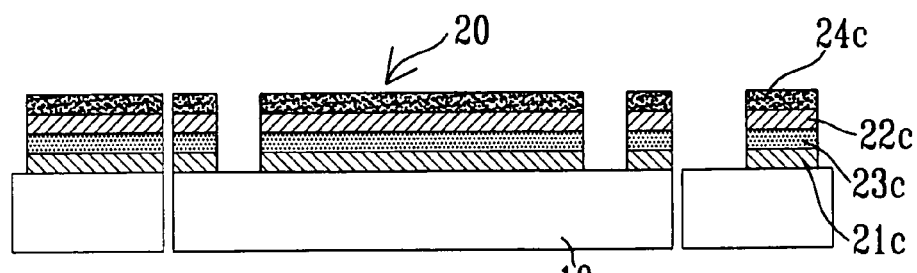
FIGS. 4A–4G show a second embodiment of a manufacturing process of an optical interference panel in accordance with the present invention, where the first conductive optical film stack is adopted from FIG. 2C.
Figure 4B:
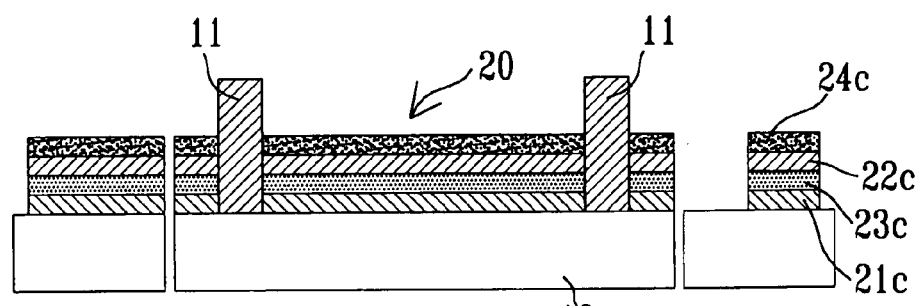
Figure 4C:
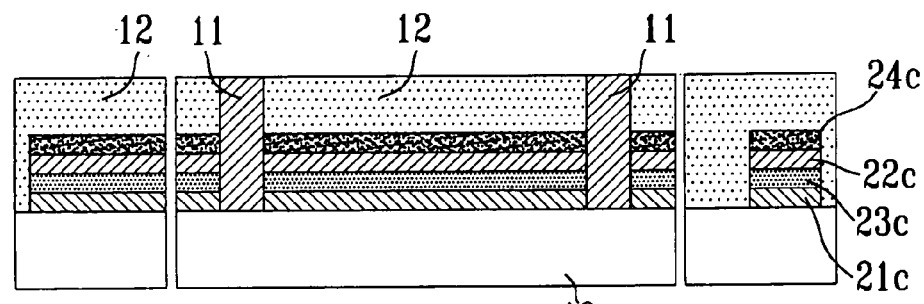
Figure 4D:
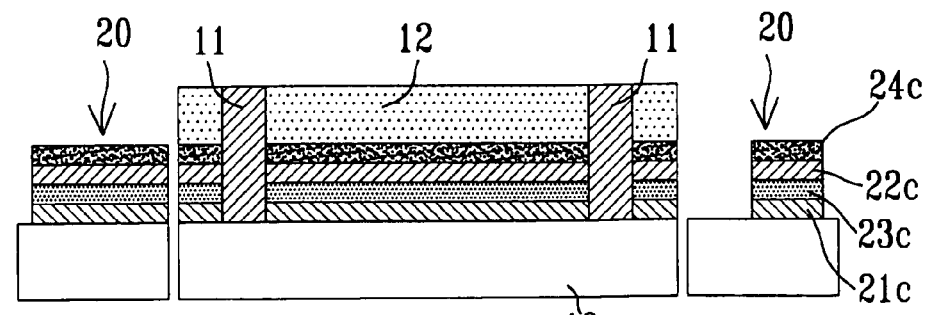
Figure 4E:
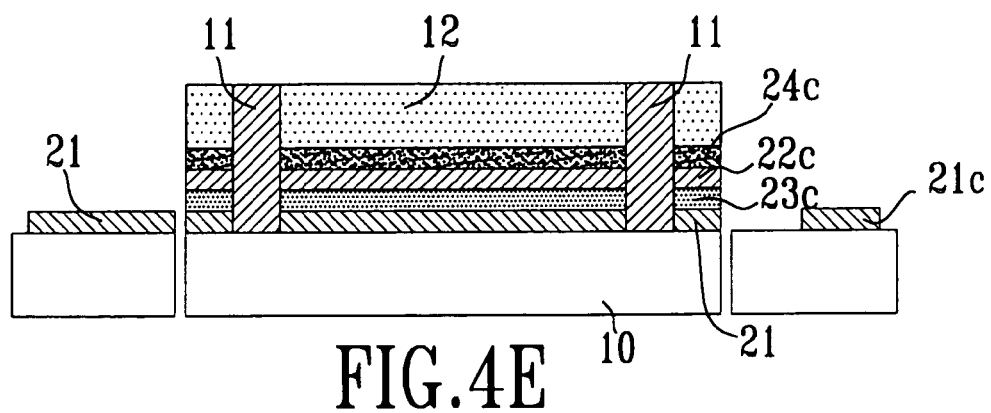
Figure 4F:
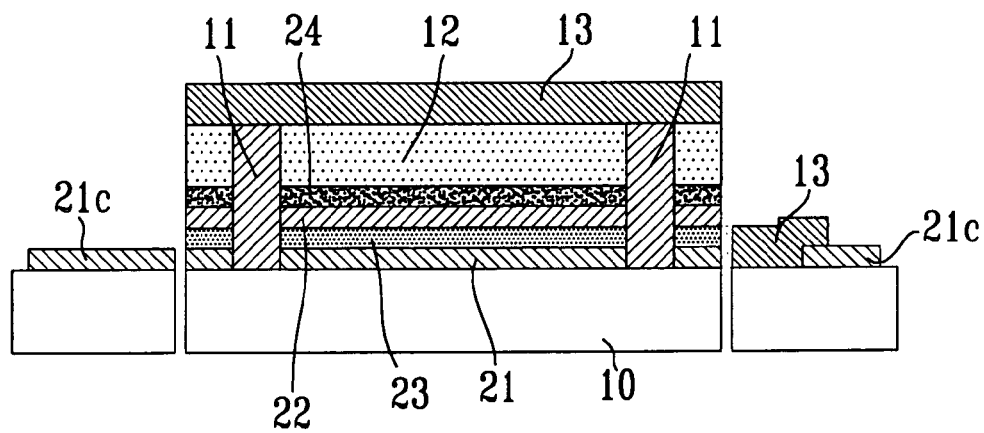
Figure 4G:
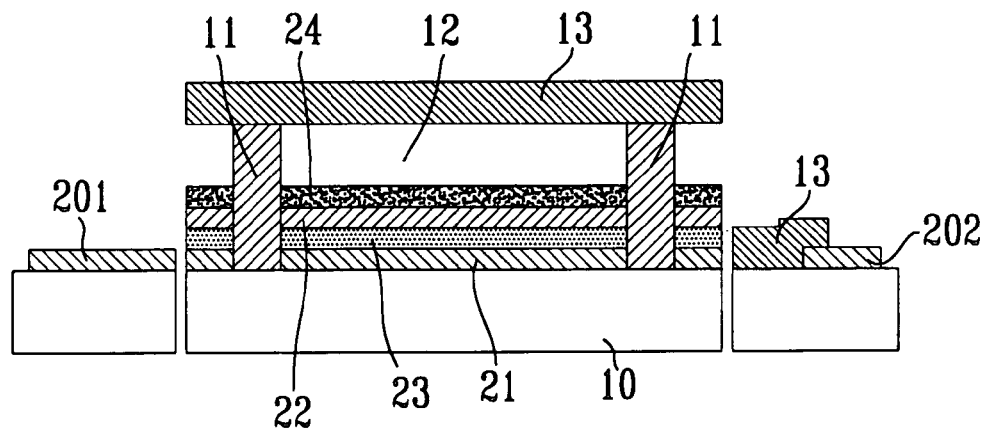

With reference to FIGS. 4A–4G, the embodiment is basically the same as the first embodiment, the only difference is that the first conductive optical film stack (20) adopts the embodiment of FIG. 2C. That is, the first conductive optical film stack (20) is sequentially composed of a transparent conductive layer (21c), a first dielectric layer (23c), an absorption layer (22c) and a second dielectric layer (24c). With reference to FIG. 4E, it is noted that the first dielectric layer (23c), the absorption layer (22c) and the second dielectric layer (24c) formed near the edge of the substrate (10) are all removed, and only the transparent conductive layer (21c) remains on the substrate (10).

Figure 5B:
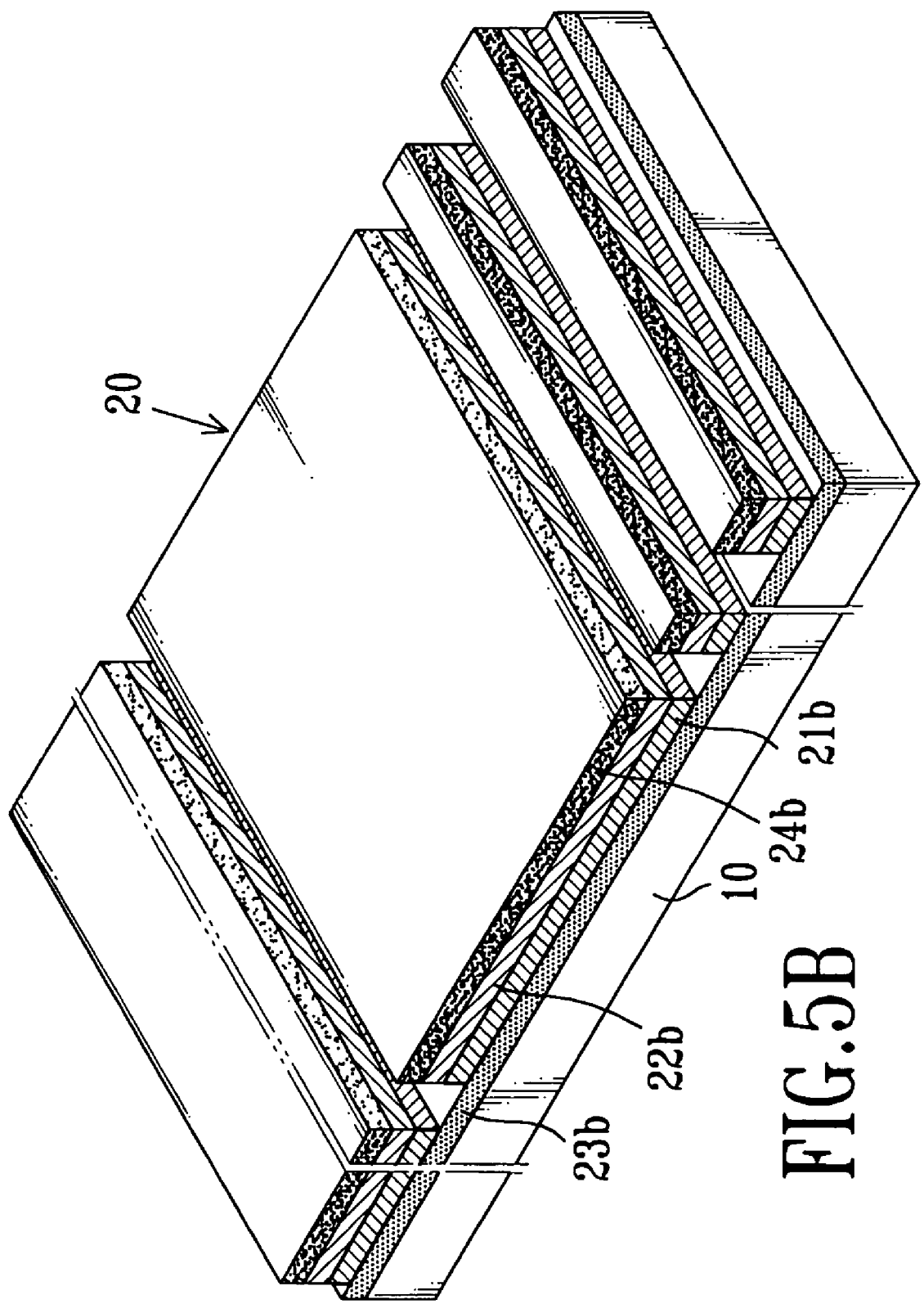
Figure 5C:
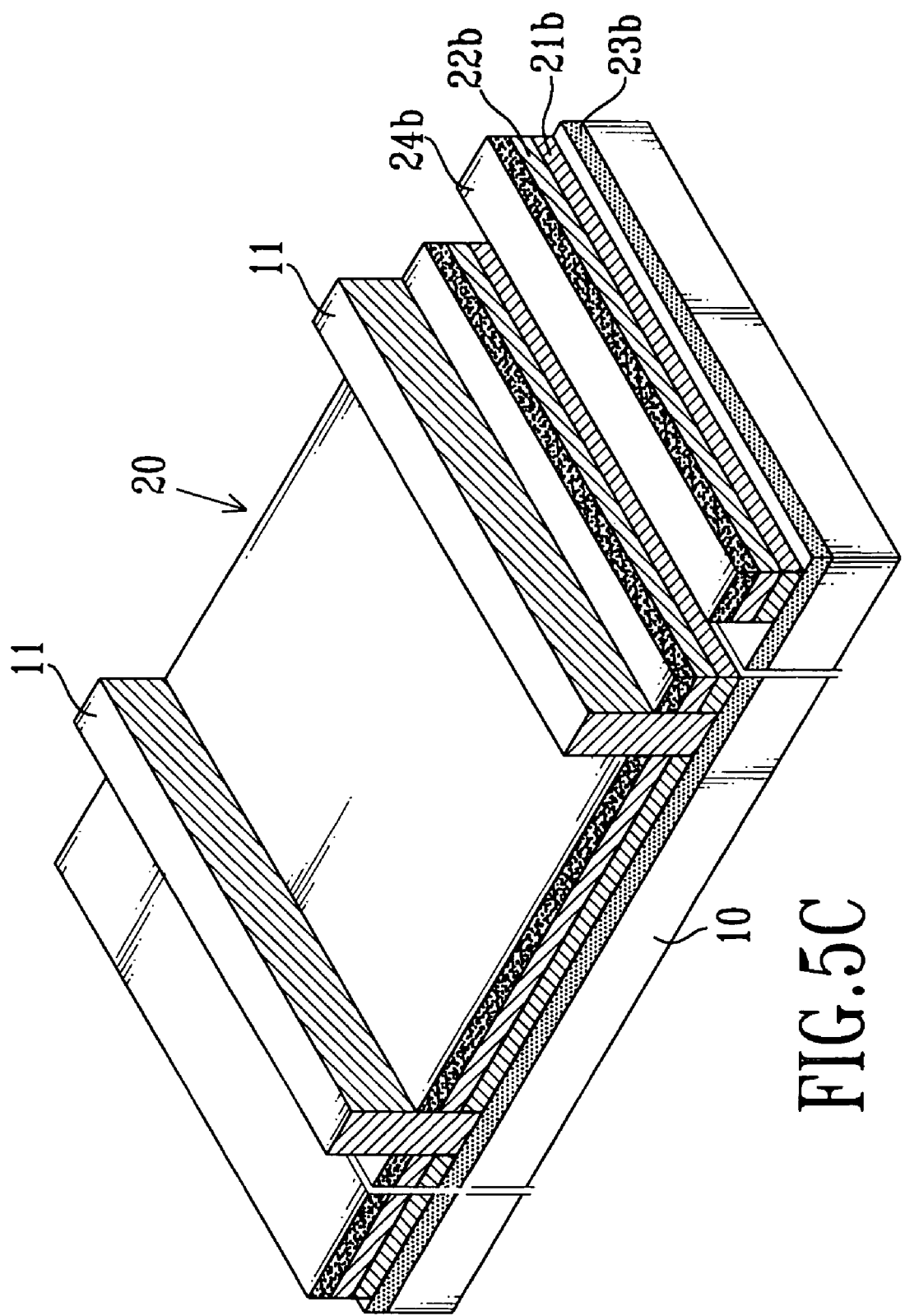
Figure 5D:
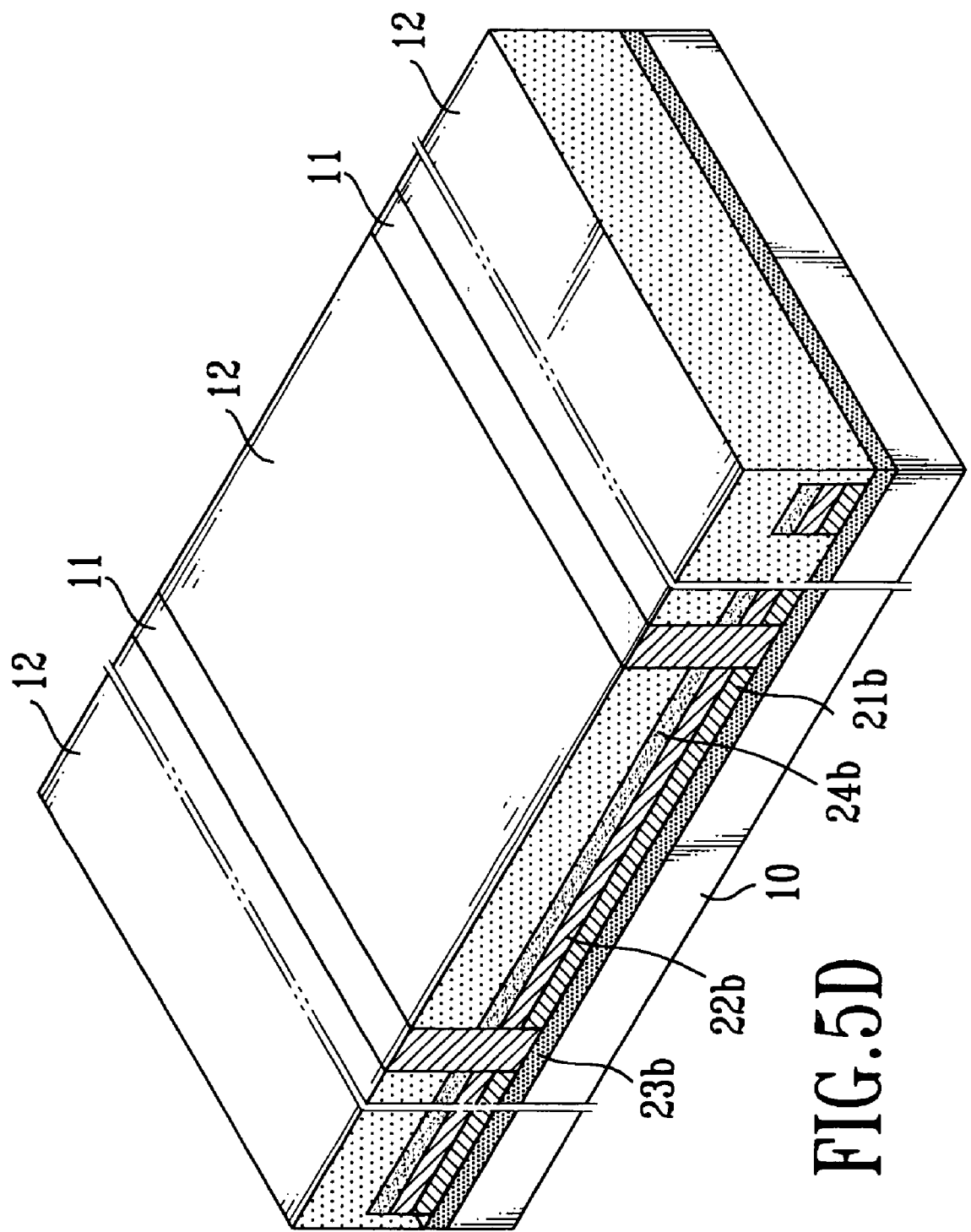
Figure 5E:
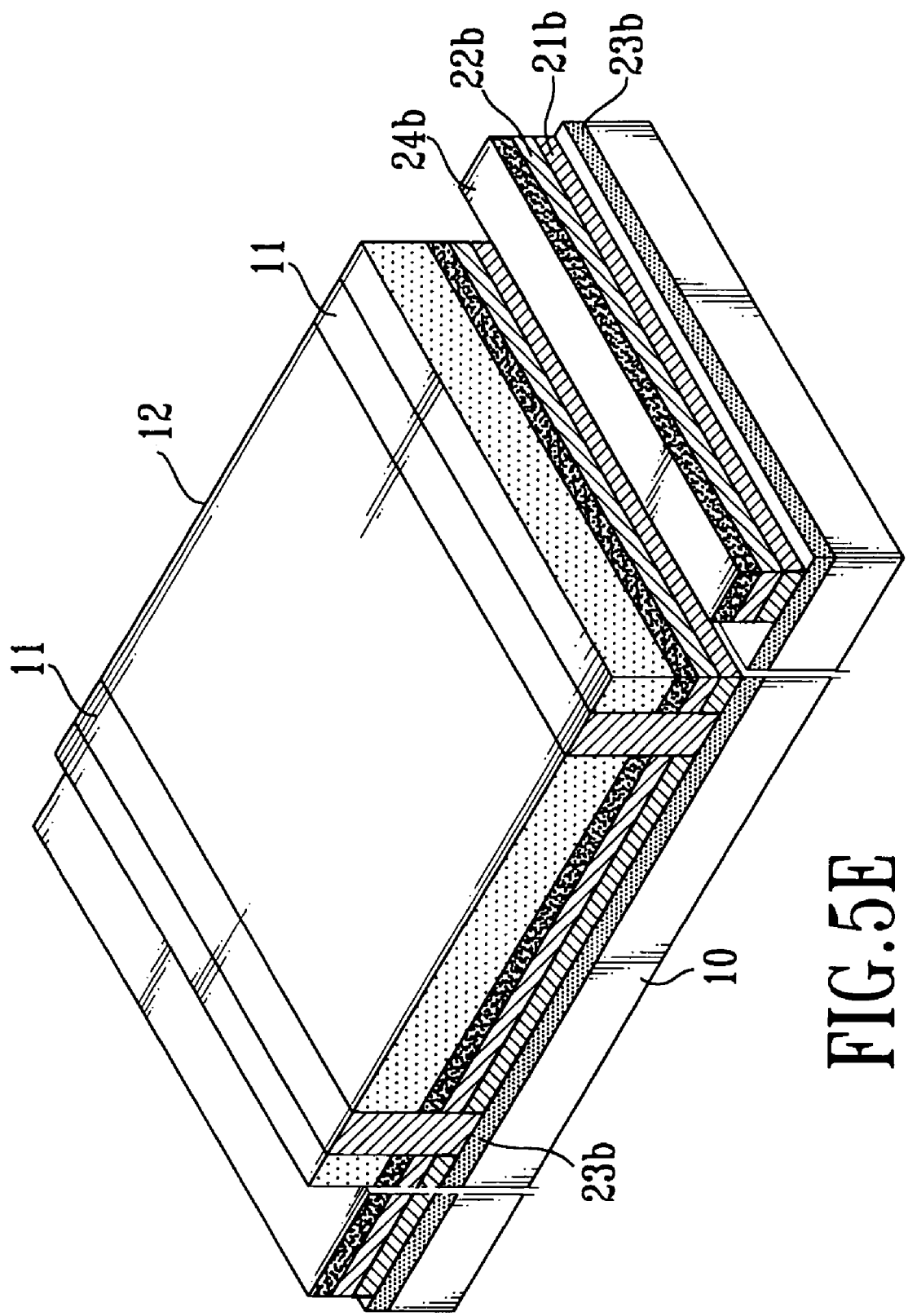
Figure 5F:
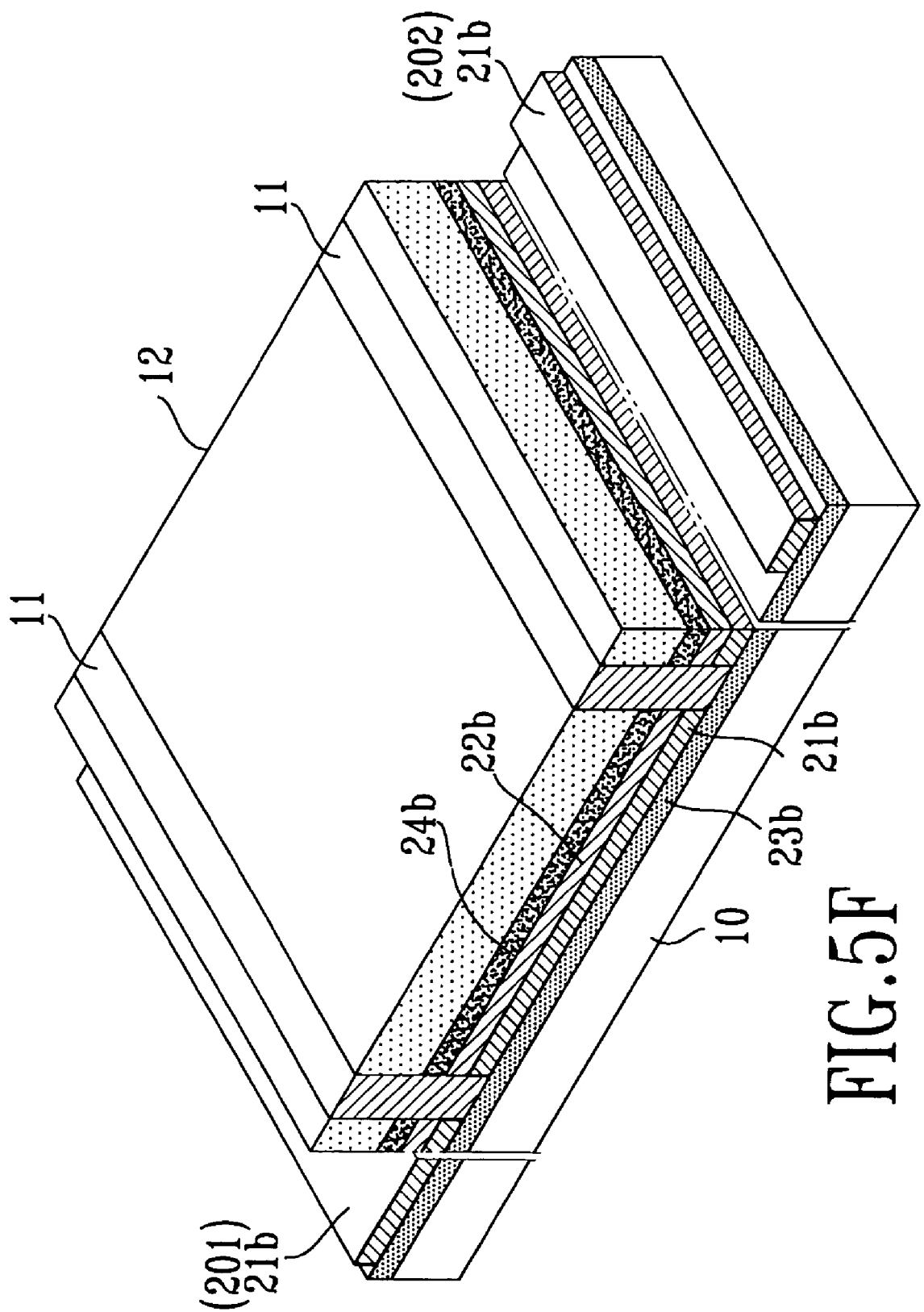
Figure 5G:
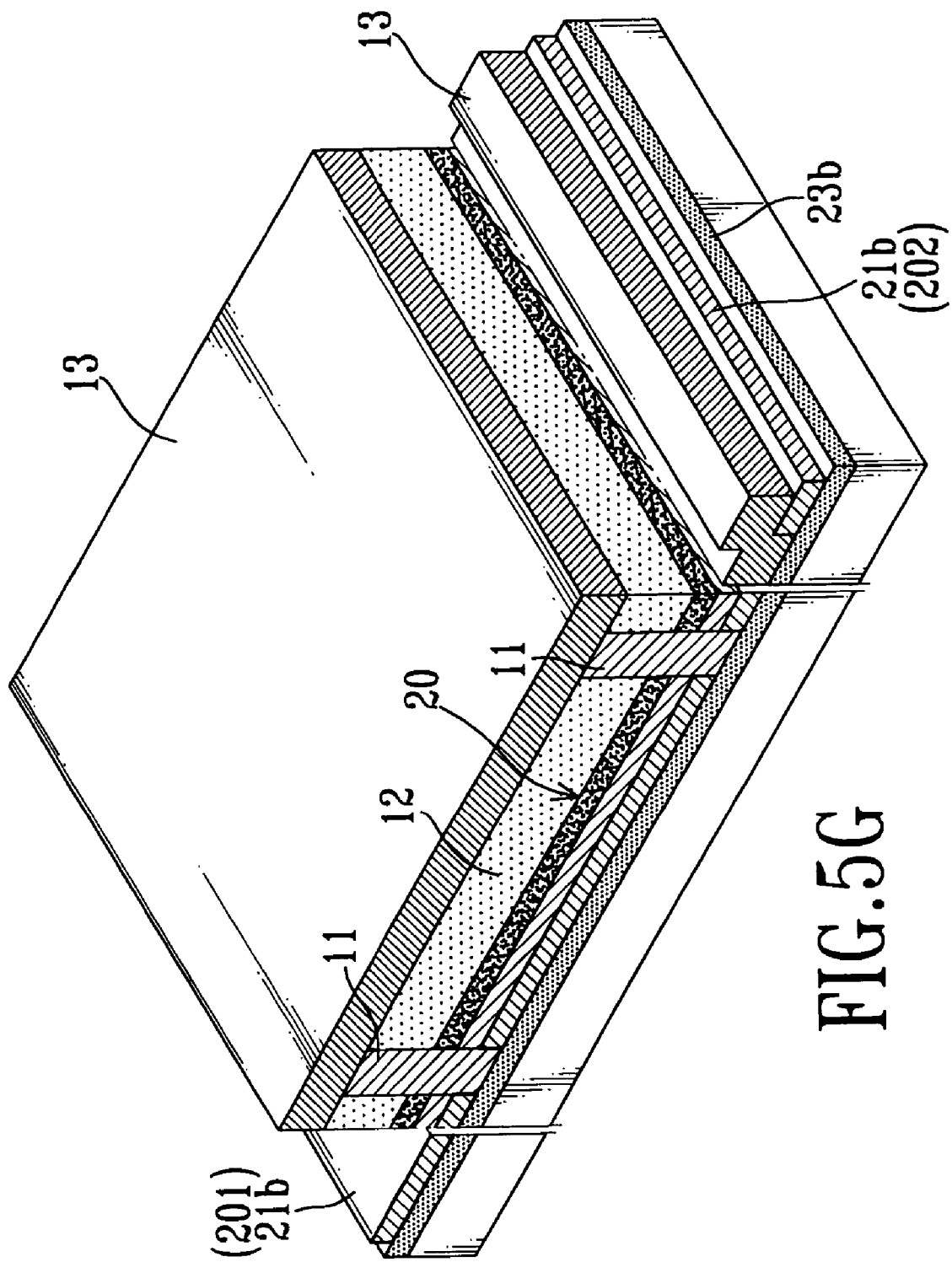
Figure 5H:
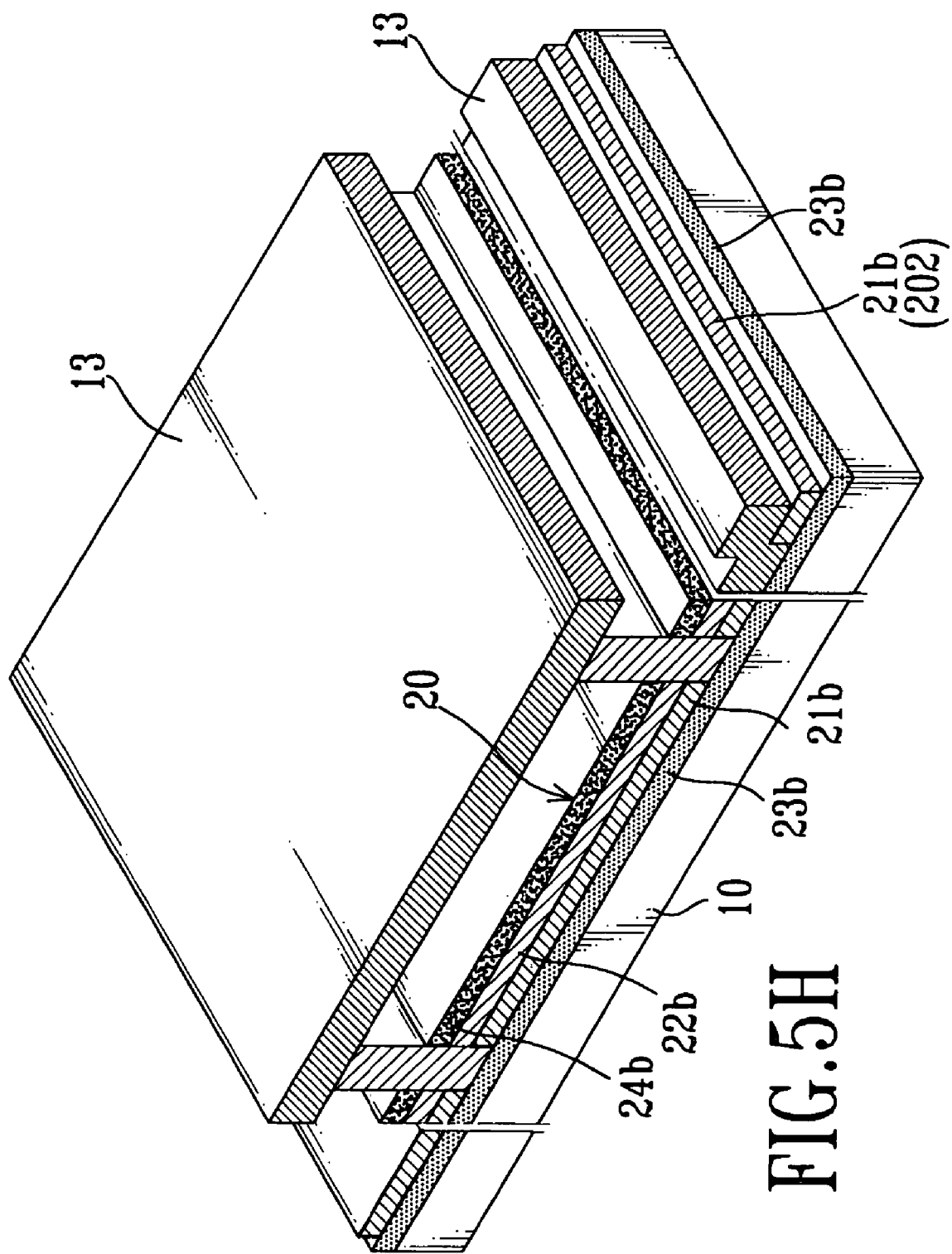

With reference to FIGS. 5A–5H, the first conductive optical film stack (20) is the same as mentioned in FIG. 2B. The basic manufacturing process is modified as follows:

sequentially forming the first dielectric layer (23b) of FIG. 5A, the transparent conductive layer (21b), the absorption layer (22b) and the second dielectric layer (24b) on the substrate (10) so as to construct the first conductive optical film stack (20);

defining patterns of connecting pads (201)(202), wherein a part of the first conductive optical film stack (20) is further patterned to form the connecting pads (201)(202) near the edge of the substrate (10);

forming a supporting layer (11) on the substrate (10), wherein a supporting layer (11) is formed on the substrate (10) where the first conductive optical film stack (20) is removed (as shown in FIG. 5C);

forming a spacing layer (12), wherein a spacing layer (12) is formed on the first conductive optical film stack (20) and is further flattened (as shown in FIG. 5D);

removing the spacing layer (12) covering the first conductive optical film stack (20) that is near the edge of the substrate (10), whereby the first conductive optical film stack (20) formed near the edge is exposed (as shown in FIG. 5E);

removing the second dielectric layer (24b) and the absorption layer (22b) of the exposed first conductive optical film stack (20) near the edge of the substrate (10), wherein the transparent conductive layer (21b) remaining on the substrate (10) is exposed and used for forming of the connecting pads (201)(202) (as shown in FIG. 5F);

forming a second conductive optical film stack (13) that covers the spacing layer (12) and the supporting layer (11) remaining on the substrate (10), wherein the second conductive optical film stack (13) is electrically connected to a part of the connecting pads (202) (as shown in FIG. 5G); and removing the spacing layer (12) below the second conductive optical film stack (13), whereby a gap is defined by the first and the second conductive optical film stacks (20)(13) (as shown in FIG. 5H).

Figure 6A:
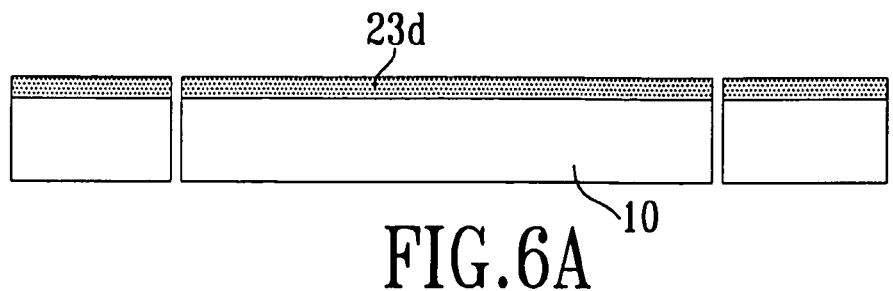
FIGS. 6A–6H show a fourth embodiment of a manufacturing process of an optical interference panel in accordance with the present invention, where the first conductive optical film stack is adopted from FIG. 2D.
Figure 6B:
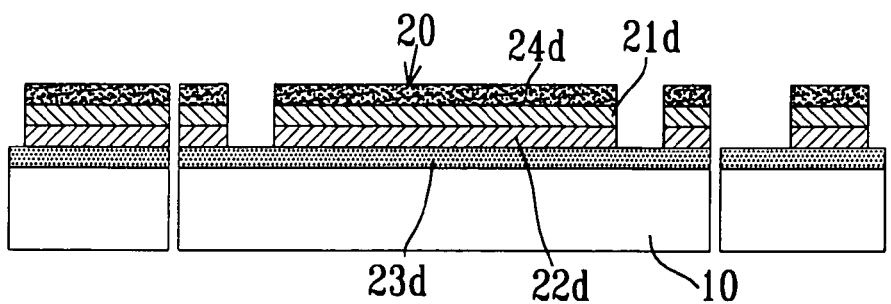
Figure 6C:
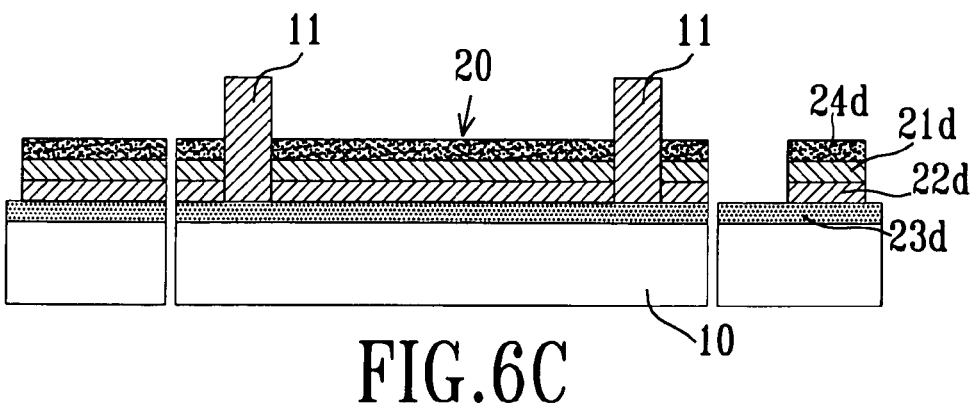
Figure 6D:
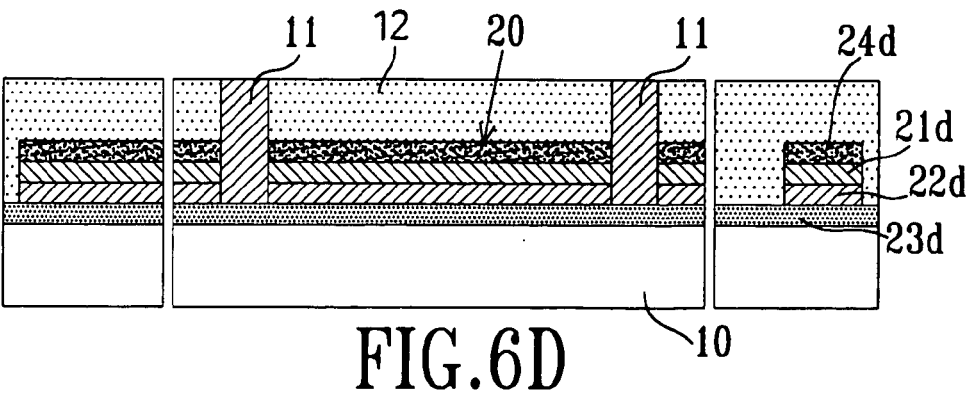
Figure 6E:
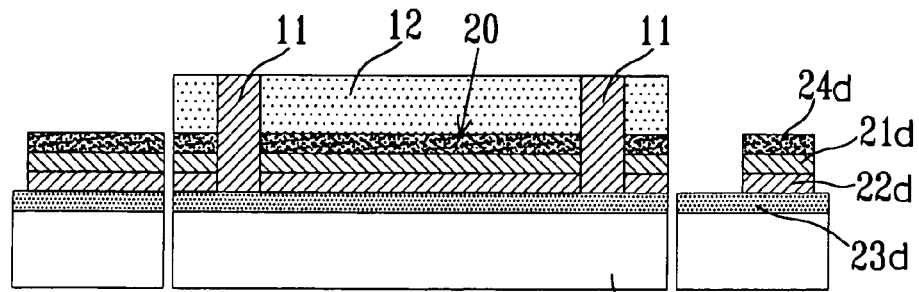
Figure 6F:
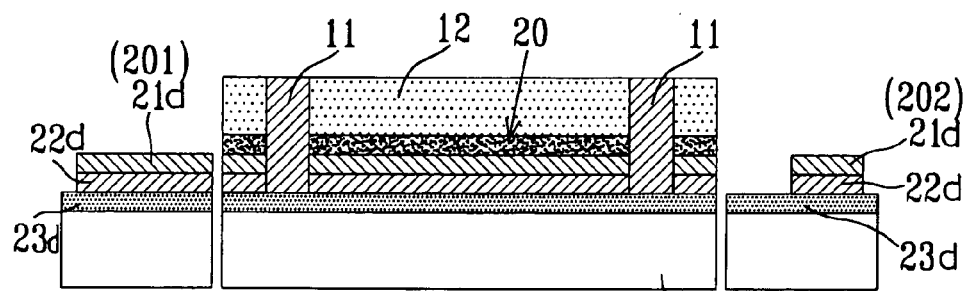
Figure 6G:
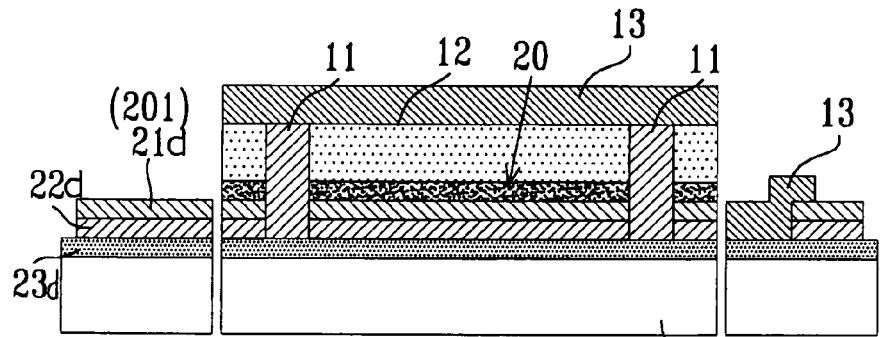
Figure 6H:
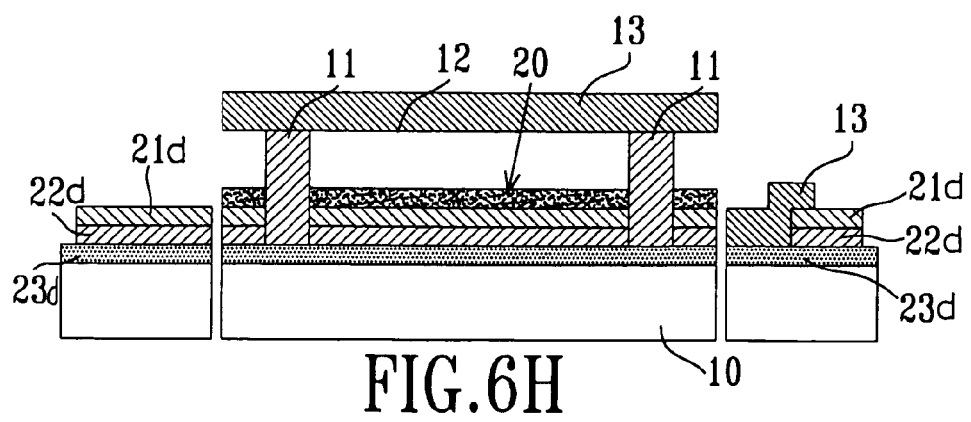
Figure 7:
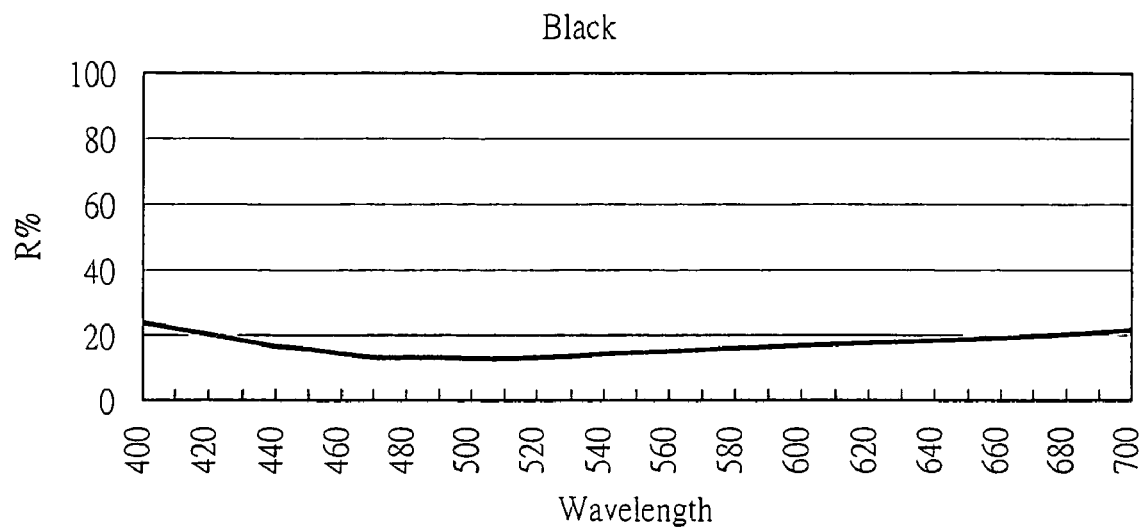
FIG. 7 is a black light spectrum chart simulated based on the panel in accordance with the present invention.
Figure 8:
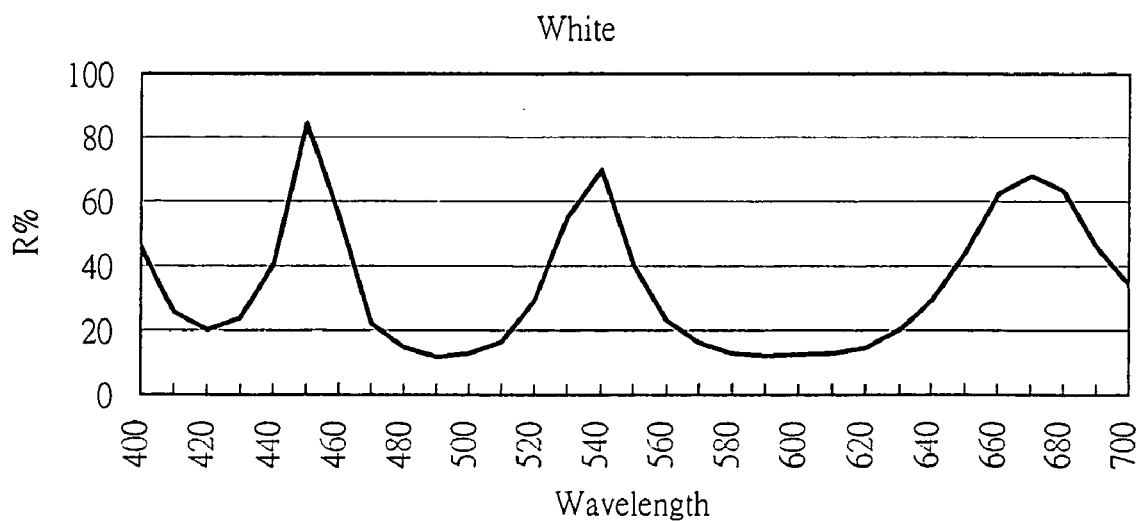
FIG. 8 is a white light spectrum chart simulated based on the panel in accordance with the present invention.
Figure 9:
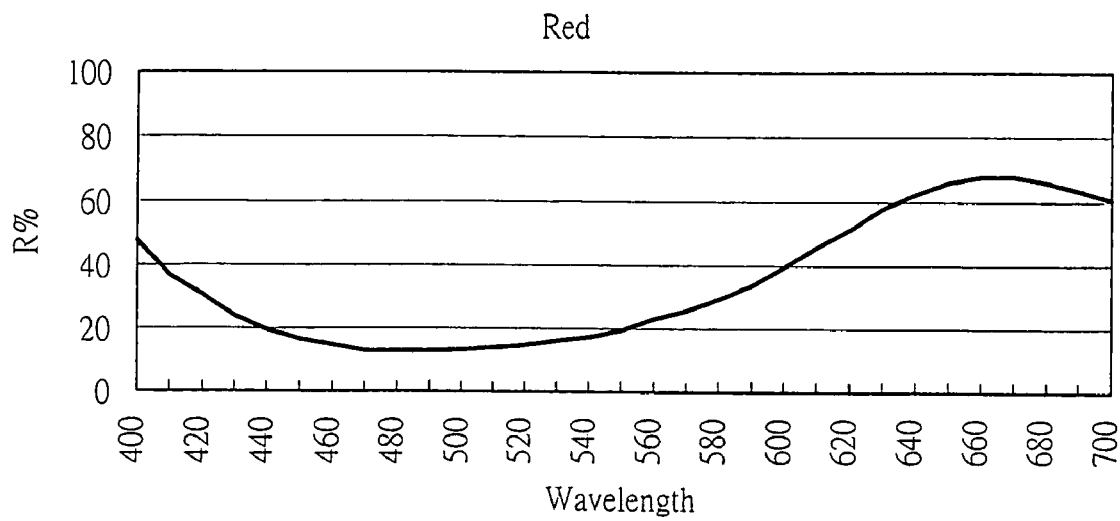
FIG. 9 is a red light spectrum chart simulated based on the panel in accordance with the present invention.
Figure 10:
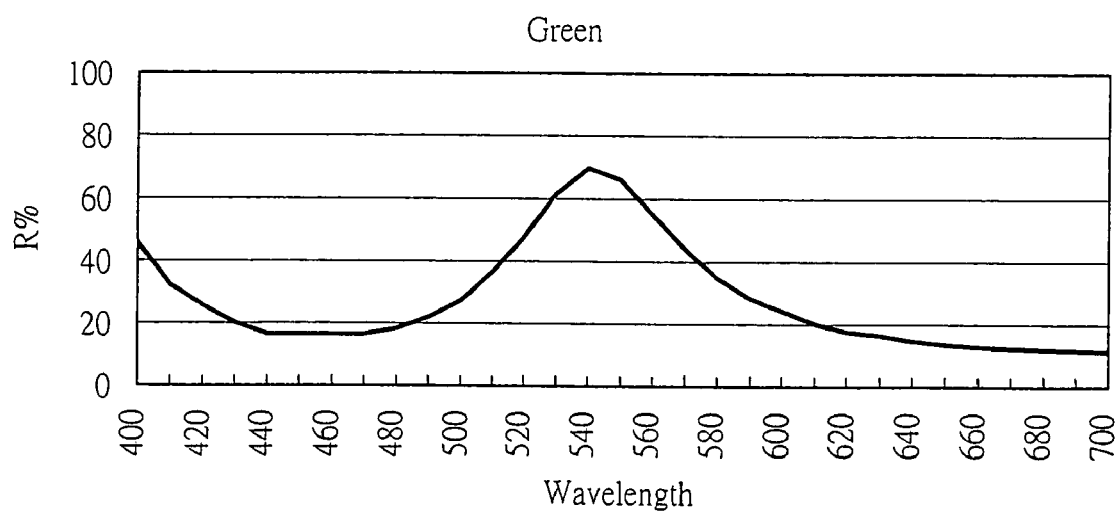
FIG. 10 is a green light spectrum chart simulated based on the panel in accordance with the present invention.
Figure 11:
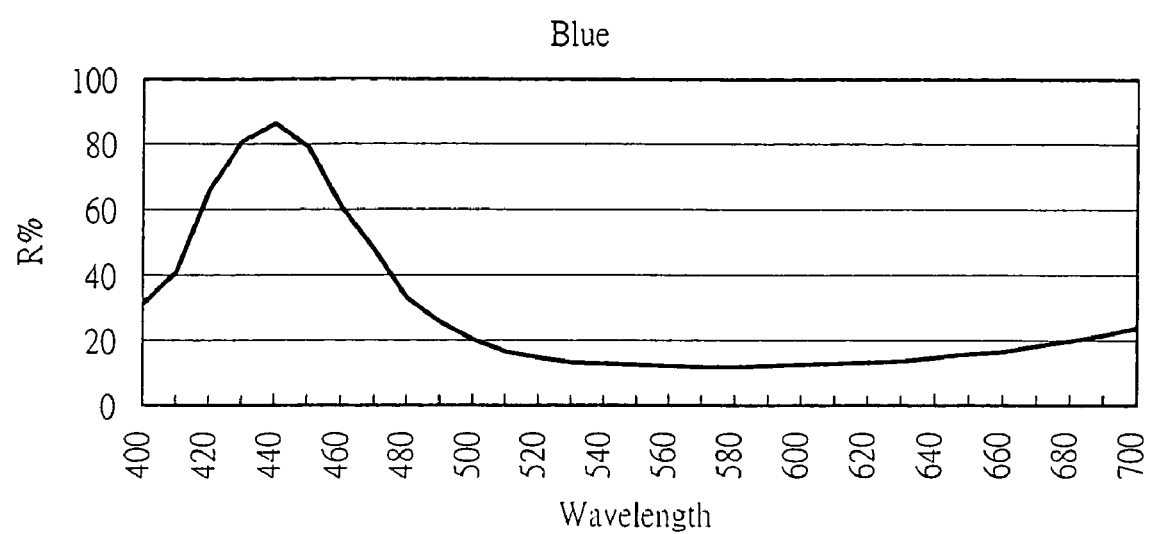
FIG. 11 is a blue light spectrum chart simulated based on the panel in accordance with the present invention.
Figure 12:
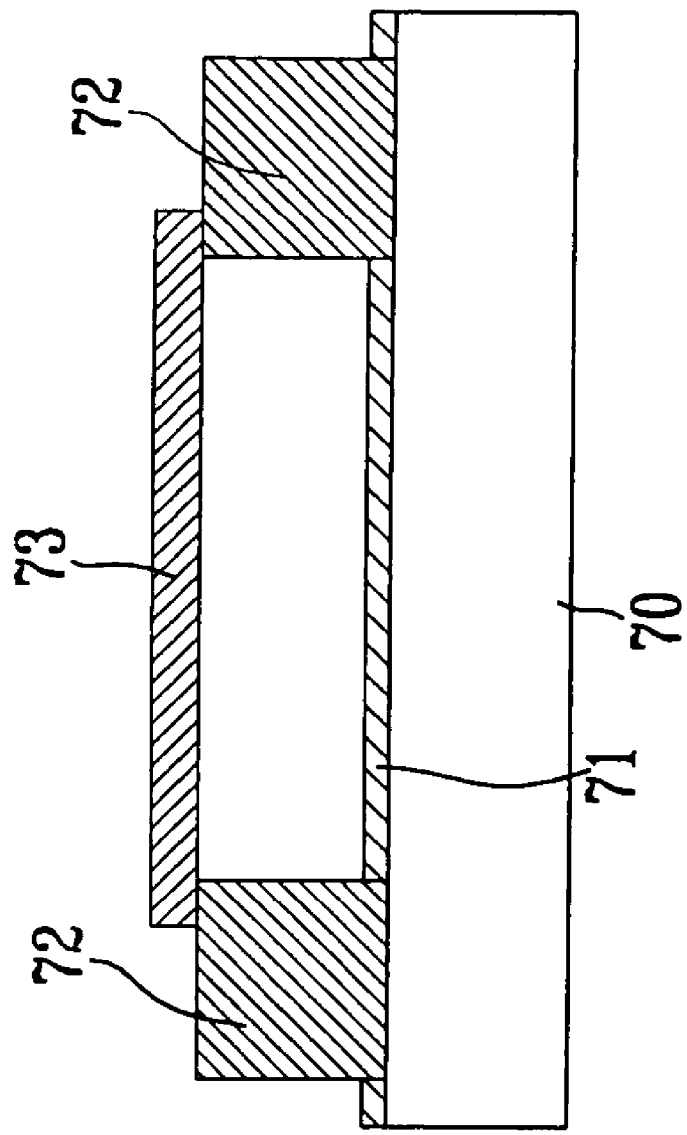
FIG. 12 is a cross sectional view of a single pixel of a convention optical-interference panel.

With reference to FIGS. 6A–6H, the fourth embodiment is basically the same as the third embodiment, the only difference is that the first conductive optical film stack (20) adopts the embodiment of FIG. 2D. That is, the first conductive optical film stack (20) is sequentially composed of a first dielectric layer (23d), an absorption layer (22d), a transparent conductive layer (21d) and a second dielectric layer (24d). With reference to FIG. 6F, it is noted that the second dielectric layer (24d) formed near the edge of the substrate (10) is removed to expose the transparent conductive layer (21d).

With reference to FIGS. 7–11, these drawings respectively show the black light, the white light, the red light, the green light and the blue light spectrum charts that are simulated from the panel of the present invention.

In conclusion, the optical-reflective type display panel of the present invention, without using a color filtering film and a polarizing film, is able to improve the use efficiency of light. Moreover, since the connecting pads are formed by the transparent conductive layer, these connecting pads have the excellent anti-oxidation ability at their surface. Thus, the connecting quality and the reliability of these connecting pads are improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making an optical interference type display panel, the method comprising the steps of:
   providing a substrate (10);
   sequentially forming a plurality of first conductive optical film stacks (20), a supporting layer (11), a spacing layer (12) and a plurality of second conductive optical film stacks (13) on the substrate (10); and
   forming a plurality of connecting pads (201)(202) near edges of the substrate (10), wherein the plurality of connecting pads (201)(202) comprises a transparent conductive layer (21) of the first conductive optical film stack (20).

2. The method as claimed in claim 1, the method further comprising the steps of:
   forming plurality of separated first conductive optical film stacks (20) on the substrate (10);
   defining patterns of connecting pads, wherein portions of these separated first conductive optical film stacks (20) are further patterned to form the plurality of connecting pads (201)(202);
   forming the supporting layer (11) on the substrate (10), wherein the supporting layer (11) is formed between two separated first conductive optical film stacks (20);
   forming the spacing layer (12), wherein the spacing layer (12) is formed above each separated first conductive optical film stack (20) and is further flattened;
   forming the plurality of second conductive optical film stacks (13), wherein these second conductive optical film stacks (13) are coated on the spacing layer (12) and the supporting layer (11), and the second conductive optical film stacks (13) are electrically connected to at least a portion of the plurality of the connecting pads (202); and
   removing the spacing layer (12), wherein once the spacing layer (12) has been removed from the substrate (10), a gap is defined between the first and the second conductive optical film stacks (20)(13).

3. The method as claimed in claim 1, wherein forming the first conductive optical film stack (20) comprises the step of:
   sequentially forming a transparent conductive layer (21a), an absorption layer (22a) and a dielectric layer (24a) on the substrate (10).

4. The method as claimed in claim 2, wherein forming the first conductive optical film stack (20) comprises the step of:
   sequentially forming a transparent conductive layer (21a), an absorption layer (22a) and a dielectric layer (24a) on the substrate (10).

5. The method as claimed in claim 1, wherein forming the first conductive optical film stack (20) comprises the step of:
   sequentially forming a first dielectric layer (23b), a transparent conductive layer (21b), an absorption layer (22b) and a second dielectric layer (24b) on the substrate (10).

6. The method as claimed in claim 2, wherein forming the first conductive optical film stack (20) comprises the step of:
   sequentially forming a first dielectric layer (23b), a transparent conductive layer (21b), an absorption layer (22b) and a second dielectric layer (24b) on the substrate (10).

7. The method as claimed in claim 1, wherein forming the first conductive optical film stack (20) comprises the step of:
   sequentially forming a transparent conductive layer (21c), a first dielectric layer (23c), an absorption layer (22c) and a second dielectric layer (24c) on the substrate (10).

8. The method as claimed in claim 2, wherein forming the first conductive optical film stack (20) comprises the step of:
   sequentially forming a transparent conductive layer (21c), a first dielectric layer (23c), an absorption layer (22c) and a second dielectric layer (24c) on the substrate (10).

9. The method as claimed in claim 1, wherein forming the first conductive optical film stack (20) comprises the step of:
sequentially forming a first dielectric layer (23d), an absorption layer (22d) a transparent conductive layer (21d) and a second dielectric layer (24d) on the substrate (10).

10. The method as claimed in claim 2, wherein forming the first conductive optical film stack (20) comprises the step of:
sequentially forming a first dielectric layer (23d), an absorption layer (22d) a transparent conductive layer (21d) and a second dielectric layer (24d) on the substrate (10).

11. An optical interference display panel comprising:
a substrate on which a plurality of first conductive optical film stacks (20), a supporting layer (11) and a plurality of second conductive optical film stacks (13) are formed; and
a plurality of connecting pads (201)(202) formed near edges of the substrate (10), wherein the plurality of connecting pads (201)(202) comprises a transparent conductive layer (21) of the first conductive optical film stack (20).

12. The display panel as claimed in claim 11, the first conductive optical film stack (20) comprising a transparent conductive layer (21a), an absorption layer (22a) and a dielectric layer (24a) on the substrate (10), which are sequentially formed on the substrate (10).

13. The display panel as claimed in claim 11, the first conductive optical film stack (20) comprising a first dielectric layer (23b), a transparent conductive layer (21b), an absorption layer (22b) and a second dielectric layer (24b), which are sequentially formed on the substrate (10).

14. The display panel as claimed in claim 11, the first conductive optical film stack (20) comprising a transparent conductive layer (21c), a first dielectric layer (23c), an absorption layer (22c) and a second dielectric layer (24c), which are sequentially formed on the substrate (10).

15. The display panel as claimed in claim 11, the first conductive optical film stack (20) comprising a first dielectric layer (23d), an absorption layer (22d) a transparent conductive layer (21d) and a second dielectric layer (24d), which are sequentially formed on the substrate (10).

* * * * *